US005729456A

United States Patent [19]

Boisvert et al.

[11] Patent Number: 5,729,456

[45] Date of Patent: *Mar. 17, 1998

[54] GLOW PLUG CONTROLLER

[75] Inventors: Mario P. Boisvert, Reed City; Stephen R.W. Cooper, Tustin; David Shank, Big Rapids, all of Mich.

[73] Assignee: Nartron Corporation, Reed City, Mich.

[ * ] Notice: The term of this patent shall not extend beyond the expiration date of Pat. No. 5,327,870.

[21] Appl. No.: 508,063

[22] Filed: Jul. 27, 1995

Related U.S. Application Data

[63] Continuation-in-part of Ser. No. 42,239, Apr. 1, 1993, Pat. No. 5,570,666, which is a continuation-in-part of Ser. No. 785,462, Oct. 31, 1991, abandoned.

[51] Int. Cl.[6] .............................. G06F 19/00; F02B 9/08

[52] U.S. Cl. .............................. 364/431.01; 364/431.04; 364/431.1; 123/145 A; 123/179.6; 123/179.21; 219/492; 219/497; 219/486

[58] Field of Search .............................. 364/431.01, 431.04, 364/431.11, 431.12, 431.051, 431.061, 431.1, 431.09; 123/569, 571, 564, 179.21, 425, 145 A, 179.6; 340/459, 449, 451, 515, 516, 652, 870.16; 219/497, 202, 492, 508, 486, 493, 494, 512, 501, 505, 205; 361/265, 757

[56] References Cited

U.S. PATENT DOCUMENTS

| | | | |
|---|---|---|---|
| 4,088,109 | 5/1978 | Woodruff et al. | 123/179.21 |
| 4,137,885 | 2/1979 | Van Ostrom | 123/179.21 |
| 4,300,491 | 11/1981 | Hara et al. | 123/179.21 |
| 4,312,307 | 1/1982 | Cooper | 123/145 A |
| 4,318,374 | 3/1982 | Yasuhara | 123/179.6 |
| 4,337,389 | 6/1982 | Bell | 219/511 |
| 4,375,205 | 3/1983 | Green | 123/179.21 |
| 4,512,295 | 4/1985 | Hanson | 123/145 A |
| 4,516,543 | 5/1985 | Abe et al. | 123/179.21 |
| 4,607,153 | 8/1986 | Ang et al. | 219/497 |
| 4,658,772 | 4/1987 | Auth et al. | 123/145 A |
| 4,862,370 | 8/1989 | Arnold et al. | 364/431.1 |
| 4,939,347 | 7/1990 | Masaka et al. | 123/179.6 |
| 5,241,929 | 9/1993 | Grassi et al. | 123/145 A |
| 5,327,870 | 7/1994 | Boisvert et al. | 123/145 A |
| 5,334,876 | 8/1994 | Washeleski et al. | 318/469 |
| 5,507,255 | 4/1996 | Boisvert et al. | 123/145 A |
| 5,570,666 | 11/1996 | Rymut et al. | 123/145 A |

*Primary Examiner*—Jacques Louis-Jacques
*Attorney, Agent, or Firm*—Watts, Hoffmann, Fisher & Heinke Co. L.P.A.

[57] ABSTRACT

The present invention relates to an improved glow plug controller. The glow plug controller includes an analog temperature sensor, circuitry for converting an analog temperature signal to digital form, a microprocessor for analyzing temperature and other operating parameters and for controlling glow plugs and monitoring indicators in accordance with algorithms defined in the microprocessor. The temperature and control signals from the microprocessor are converted to analog form and applied to actuate glow plugs and indicators in accordance with determinations made by the microprocessor. A specific embodiment includes a manual override for facilitating operation even if the microprocessor should fail. A false temperature input is provided so that a false temperature representation can be directly applied to the microprocessor for factory and service center testing of microprocessor operation. Glow plug operation is controlled by way of a relay and multiple, independently fused glow plug circuits. Diagnostic devices are provided for indicating to an operator when a glow plug short circuit has caused a fuse to open the glow plug circuit, and to indicate as well the number of such circuits which have been opened by short circuit malfunctions. Disabling devices are provided for cutting off power to the glow plugs in response to engine temperature exceeding a predetermined maximum of 88° Celsius. The programmed microprocessor includes devices for establishing a preglow period as a function of engine temperature, and for initiating the afterglow in response to the cessation of cranking the engine.

11 Claims, 24 Drawing Sheets

GLOW PLUG CONTROLLER

CROSS-REFERENCE

The present application is a continuation-in-part patent application of original U.S. patent application Ser. No. 08/042,239 filed Apr. 1, 1993, now U.S. Pat. No. 5,570,666, which is a continuation-in-part of Ser. No. 07/785,462 filed Oct. 31, 1991, now abandoned. Priority from application Ser. No. 07/785,462 is explicitly claimed.

FIELD OF THE INVENTION

This invention relates generally to the field of diesel powered vehicles, and more particularly to improved controller circuitry, and mounting and housing structure therefor, for governing operation of the glow plugs of the engine of such a vehicle.

BACKGROUND ART

The present invention is intended for use in an environment of a self-propelled vehicle or other piece of equipment which is powered by a known form of internal combustion engine. The invention is preferably designed for use in connection with a vehicle or other equipment powered by a diesel engine.

Diesel engines do not use spark plugs. Rather, they rely for ignition of the fuel-air mixture on compression of that mixture by rapid motion of a piston to reduce the volume of a fuel-air charge in the combustion chamber.

When a diesel engine is started, however, known glow plugs are used to assist in providing engine starting ignition. The glow plugs typically are operated for a brief time.

Vehicles of the type forming the environment for the present invention are commonly heavy-duty military and commercial vehicles such as trucks, buses, infantry fighting vehicles, tanks, and others. Because such vehicles are typically operated by a large number of operators having different skill levels, considerable warning and protection equipment is incorporated into such vehicles. This warning and protection equipment includes means for informing an operator of the operations and conditions of certain vehicle and engine components.

The glow plugs of diesel engines are commonly controlled by a glow plug controller circuit. The glow plug controller circuit, upon an operator turning on the ignition, applies a high DC current, often in the neighborhood of 150 amps, to the glow plugs continuously during what is known as a "preglow" mode. A sensor detects the temperature of the engine and controls the preglow mode which endures for a period of time, typically 3–8 seconds. Following the preglow portion of the cycle, the glow plug controller shifts to an "afterglow" portion of the cycle. During the afterglow portion, the glow plugs are continued in pulsed operation for a time that is fixed for a given sensed temperature. Sometimes, during the afterglow cycle, the duty cycle of the glow plugs is adjusted, the duty cycle being reduced as the ambient engine temperature rises prior to glow plug cut-off.

In the diesel cycle, ignition occurs when a suitable combination of pressure and temperature is reached. Ideally, this ignition occurs at the completion of the compression stroke of the piston. However, if the gas under compression is too cool, ignition may not occur or be inadequate to ensure complete combustion. Incomplete combustion results in both pollution and lost efficiency. The diesel design is optimized to produce ignition and complete combustion under normal running conditions when the engine is heated by the combustion process. If the engine is too cool, its compression ratio is too low, or the ambient air pressure is depressed, sub-optimal performance and pollution will result.

The low-performance of a cool engine is overcome by the use of glow plugs, as described above, to preheat the engine and thereby ensure adequate temperature for ignition and combustion at the conclusion of the compression stroke. In such applications, it is common to use temperature sensors for feedback to the glow plug controllers. The controller uses the temperature feedback to power the glow plugs only when engine temperature is too low. This prevents a waste of power and damage to the glow plugs that would occur in an open-cycle controller that continued to power the glow plugs after operational temperatures had been reached or exceeded. However, a problem arises in that the optimum temperature varies with the maximum pressure that is achieved in the compression stroke of a diesel engine. This maximum pressure, in turn, can vary with altitude and/or time as the engine wears and loses compression. For instance, increased altitude, or a loss of compression after extensive use, would both serve to lower the pressure achieved at the peak of the compression stroke. As a result, the preset engine temperature would no longer be optimal.

FIG. 1A is a partial schematic, partial block diagram illustrating some of the electrical components of a diesel engine and associated peripheral equipment which form the environment for the present invention. The items illustrated in FIG. 1A do not form part of the present invention per se, but rather are known components in connection with which the present invention, described in detail in succeeding sections, operates. The components illustrated in FIG. 1A are all known and within the skill of one ordinarily conversant with the relevant art. FIG. 1A, and this description, is provided for the benefit of those not intimately familiar with this art. FIG. 1A is not intended as a detailed schematic description of these known components. Rather, FIG. 1A is intended only for a general understanding of the relationship among these components.

Toward the left-hand portion of FIG. 1A is a column of eight glow plugs, the uppermost of which is indicated by the reference character G. Operation of the glow plugs is governed by a glow plug controller indicated as GPC. An electric starter motor M, with associated switching, is provided for starting the engine. Batteries B are provided for selectively actuating the starter motor M, and for providing DC electrical power for operating other electrical components of the vehicle and for peripheral components of the engine as needed. The vehicle batteries provide 24 volts DC. The vehicle operates, while running, at 28 volts. Preferably, two batteries in series are provided.

A run/start switch RS is provided for actuating the vehicle ignition circuitry and for selectively actuating the starter.

An alternator A, driven by the engine, provides electrical power for charging the batteries B for providing electrical power to the vehicles loads. The alternator A has an "R tap," (connected to the field) indicated by reference character R.

A fuel solenoid F governs flow of fuel to the engine.

A clutch control C electrically engages and disengages an electric motor driven engine cooling fan.

A wait-to-start lamp W provides a visual indication to an operator when the preglow cycle is occurring and it would thus be inappropriate to try to start the diesel engine. A brake warning lamp BW indicates to the operator when a parking brake is set. The brake warning lamp BW also indicates when the start solenoid is engaged. A brake pressure switch BP provides an indication to the operator when a predetermined amount of force is applied to the service brake pedal. A park brake switch PB, indicates by means of the lamp that the vehicle parking brake is set.

The electrical system of the engine operates several types of electrical loads. One such load is a heater motor indicated generally at the reference character H. Lighting loads are connected to a lead generally indicated by the reference character LL. Certain miscellaneous electrical vehicle loads are indicated by the resistor at reference character VL.

The present invention, as will be described in detail, includes improved circuitry and sub-circuits for governing and safe-guarding operation of the known components illustrated in FIG. A. Interfaces for connecting the known components of FIG. 1A are provided by an engine connector C1 and a body connector C2, both illustrated in FIG. 1A. These connectors interface between the inventive circuitry (not shown in FIG. 1A) and the engine and vehicle components shown in FIG. 1A.

The concept of controlling glow plugs with solid state controller devices including clocking circuits regulating such functions as glow plug preheat and afterglow control, as well as control of the duty cycle of glow plugs, and temperature related control, is well known. For example, Arnold et al., U.S. Pat. No. 4,882,370, shows a solid state microprocessor controlled device for regulating many aspects of glow plug performance. The Arnold circuitry adjusts the duty cycle of glow plugs as a function of temperature, regulates preglow function, and detects undesirable short circuits and open circuits for implementing a disable function. U.S. Pat. No. 4,300,491, to Hara et al., achieves a variable time control of the preglow period by means of a plurality of transistors and diodes. Van Ostrom, U.S. Pat. No. 4,137,885 describes means for cyclicly interrupting a glow plug energizing circuit when a maximum temperature is reached. Cooper, U.S. Pat. No. 4,312,307 describes circuitry for control of the duty cycle of glow plugs by means of heat-sensitive switches. Each of the above-identified United States patents listed in this paragraph are hereby expressly incorporated by reference.

Analog circuitry for controlling glow plug operation is also described in U.S. Pat. No. 5,327,870, issuing on Jul. 12, 1994 to Boisvert et al., owned by the assignee of the present application. This U.S. Pat. No. 5,327,870 is also expressly incorporated by reference herein.

One problem with electrical circuitry, such as timers and the like, used for controlling glow plug operation is that their operation is often temperature sensitive. As internal and external temperatures vary, sometimes the time intervals established by the glow plug controller will vary as well, in an undesirable manner. This, of course, is distinguished from the desirable, deliberate variation of timing as a function of a temperature such as sensed engine temperature, or some other parameter whose variation is thought to desirably call for variation in glow plug operation.

Where analog electrical circuitry and mechanical timing mechanisms are employed, difficulties often arise in maintaining repeatable time intervals for corresponding conditions. For example, such circuitry and mechanisms can drift when subjected to changes in internal and external operating temperatures.

Difficulties also occur in trying to monitor engine temperature and to control the glow plugs from a single compact package. The analog circuit elements and mechanical timers tend to be bulky and cumbersome.

Additionally, problems arise in trying to inexpensively maintain repeatable time intervals from sample to sample when glow plug controllers are produced by mass production. Unless precision analog circuit elements are used, which are very expensive, uniformity of performance among mass produced units is sometimes lacking.

It is a general object of the present invention to provide improved glow plug controller circuitry, and mounting and housing structure for such a glow plug controller, to enhance the precision and efficiency of control of operation of the glow plugs of a diesel engine, and to enhance the durability, reliability and ease of assembly of the glow plug controller.

Another general object of the present invention is to provide a glow plug controller which is compact, accurate in its timing functions, is relatively inexpensive to manufacture, and which does not suffer from undue performance variations from sample to sample.

DESCRIPTION OF THE INVENTION

The disadvantages of the prior art are reduced or eliminated by the present invention, one embodiment of which provides an improved glow plug controller for governing application of electrical power to a glow plug in a diesel engine. The glow plug controller comprises a sensor for producing an analog temperature signal and an analog to digital converter for converting the analog temperature signal to digital form. The controller further includes digital circuitry for producing a glow plug control signal in response to the digitized temperature signal and a digital to analog converter for converting the digital control signal back into analog form and for applying the analog converted digital control signal to control application of the electrical power to the glow plug. The conversion of the temperature signal to digital form enables its processing by digital circuitry which is reliable, versatile and durable, enabling the glow plug controller to function well in a hostile environment which may include severe temperature changes and physical vibration.

In the microprocessor controlled glow plug controller, timing tasks are performed, not by known types of RC timing mechanisms, but rather by incorporation of such tasks into timing loops within the microprocessor software. Additionally, the output of one or more temperature sensors is read by the microprocessor which controls glow plug operation in accordance with a predetermined process or program, as a function of sensed temperature. This overcomes the limitations associated with the simple voltage comparisons and computations of the analog amplifiers and digital elements of non-microprocessor based controller circuitry. Use of a microprocessor controlled configuration also eliminates circuit drift characteristics associated with prior art RC timing elements. The microprocessor also monitors supply voltage and modifies its control of the glow plugs to compensate for high or low voltage conditions. Additionally, a microprocessor allows the use of adaptive processes that can modify their response to accommodate changes in diesel engine performance which might occur with variation in variables such as altitude, engine heating rate, cylinder compression ratio, and the composition of engine exhaust.

For instance, as an engine wears, its compression can be expected to drop. As a result, it would be desirable to supply a greater degree of heating at engine start-up to compensate for the loss of compression. The additional heating compensates for the decrease in compression heating due to the loss of compression.

Indications from other sensors are also used as well as inputs to effect microprocessor glow plug control as a function of those other inputs. Such indications are used to make adjustments based on correlations between sensor information and engine status, and operating characteristics. For example, an ambient barometric pressure sensor can be read and that information used to adjust glow plug control. At high altitudes, the air is less dense and cylinder compression would drop. Compression of thin air produces less cylinder heat than does compression of more dense air. This condition is compensated by a microprocessor process which computes and implements an increased glow plug duty cycle to provide a higher starting temperature.

Other microprocessor controlled processes are used to compensate for changes in hysteresis between sensor indications such as engine temperature and the actual temperature during compression.

Additionally, the output of exhaust sensors that monitor exhaust components is monitored and control adapted to minimize undesirable exhaust components such as smoke. When smoke in the exhaust is a result of incomplete combustion, the problem is lessened by operating the glow plugs at a higher temperature and applying more heating energy to the cylinders, to facilitate more complete combustion.

In other embodiments, the microprocessor is replaced by a Programmable Logic Device (PLD) or a Custom Logic Device.

According to a more specific embodiment, the digital circuitry comprises a microprocessor for swiftly and accurately generating the ideal glow plug control for a variety of situations, taking into account many variables.

In another specific embodiment, means is provided for manual override by an operator of microprocessor control of the electric power application to the glow plugs. This feature affords the flexibility of continuing operation even if the microprocessor or other parts of the digital circuitry should malfunction.

In accordance with another specific embodiment, the glow plug controller further includes circuitry for defining an artificial input representing a temperature from a source other than the actual temperature sensor for facilitating testing of performance without an input signal representing an actual temperature. This enables factory testing at any temperature.

According to another embodiment of the invention, there is provided a system governing the application of electrical power to a glow plug in a diesel engine. The system includes a circuit connecting the glow plug with a source of electric power and a relay for selectively opening and closing the circuit. The circuit also includes a fuse interposed therein, in addition to the relay, and glow plug controller circuitry for controlling operation of the relay in response to a signal representing an engine parameter. Finally, the system includes a sensor for producing a signal representing the engine parameter to enable selective opening and closing of the relay in the fused circuit. Fusing of the glow plug enables use of a smaller relay than would be possible without the fuse, because the relay does not have to bear the full current of a glow plug short. Consequent arcing is minimized.

According to a more specific embodiment, the controller includes circuitry for monitoring whether the fuse has broken the connecting circuit. Such fusing and monitoring facilitates detection of a short in the glow plug or in the connecting circuit. When a short occurs, if power is applied, the fuse opens the connecting circuit, and the monitoring device indicates that a short circuit condition has occurred, warning the operator of the need for an appropriate response. Operation continues with remaining operable glow plugs, if any.

According to a more specific embodiment, the system further comprises indicator circuitry for producing an indication in response to the monitoring circuitry for indicating when a fuse has opened the connecting circuit.

Where the engine has a plurality of glow plugs and a plurality of the connecting circuits, the system further includes each of the connecting circuits having a fuse interposed therein and the monitoring circuitry and indicator circuitry comprise means for indicating to an operator the number of circuits which have opened by virtue of the fuses. According to a more specific embodiment, where the diesel engine includes an even number of glow plugs, the system further comprises a plurality of control circuits with each control circuit connecting a unique pair of the glow plugs to an electric power source.

According to another specific embodiment, the monitoring circuitry operates by causing a wait lamp to flash, rather than to bum continuously, in response to the detection of a connecting circuit which is opened by its associated fuse.

According to another embodiment of the invention, a system is provided for controlling operation of a glow plug in a diesel engine, the system including a temperature sensor and circuitry coupled to the temperature sensor for operating the glow plug as a function of sensed temperature. Additionally, the embodiment includes circuitry for inhibiting a function in response to sensing of a temperature greater than a predetermined maximum. More specifically, the predetermined maximum is determined at 88° Celsius.

According to another feature of the invention, a system is provided for governing application of electrical power to a glow plug in a diesel engine, the engine including means for cranking the engine for starting, the system having a user control switch, and user controlled apparatus and circuitry for actuating the cranking means, along with circuitry for providing a cranking signal only when the cranking means is providing engine cranking. The glow plug controller includes circuitry actuable by the user controlled switch for applying electrical power to the glow plug in a preglow period, and circuitry responsive to cessation of the cranking signal to apply electrical power to the glow plug in an afterglow period, the afterglow period being defined as initiating in response to cessation of the cranking signal. This aspect to the invention provides a "customized" initiation for the afterglow period which is substantially coincident with engine starting. Thus, the preglow period is terminated upon engine starting, and the afterglow period is begun when the engine starts. This has the advantage of adapting the application of electric power in the afterglow mode following starting of the engine, after which application of the power in a mode different from the preglow mode is advantageous.

In a more specific aspect, the invention includes circuitry for applying electrical power to the glow plug during actual engine cranking, as well as before and after the cranking period. An additional specific aspect includes an indicator for providing an indication to the user that the afterglow period has been initiated. A further specific aspect includes means for providing to the user an indication of the termination of the preglow period. These features provide the operator with additional information on the operating mode of the glow plugs during preglow and through the expiration of the afterglow period.

BEST MODE FOR CARRYING OUT THE INVENTION

General Description of Preferred Embodiment

The preferred embodiment of this invention comprises a glow plug control module which utilizes a microprocessor and one relay to control the operation of eight glow plugs in a diesel engine. This section outlines the principal features of the controller requirements for the glow plug controller. This description is directed to a glow plug control unit to be used on a diesel engine model 8V-71 Low Heat Rejection Engine, manufactured by the Detroit Diesel Corporation of Detroit, Mich., USA. The glow plug controller GPC assists in low temperature engine starting by energizing the glow plugs for pre-set times before and after engine cranking takes place. The unit preferably is housed to meet requirements for water-proof housings as set forth in United States government regulations.

Configuration

Figure 1:
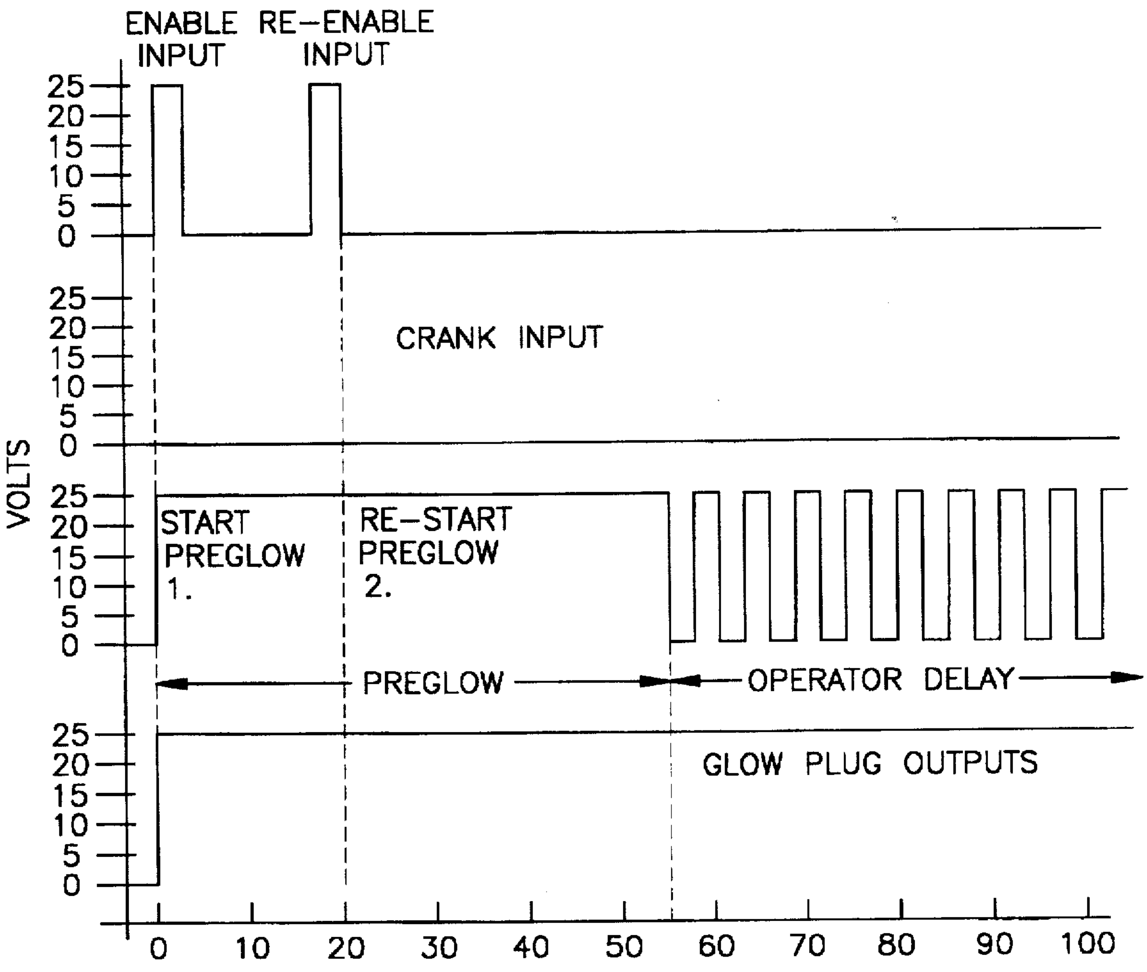
FIGS. 1–10 are diagrams illustrating sequences of operations of the performance of the present invention.
Figure 1A:
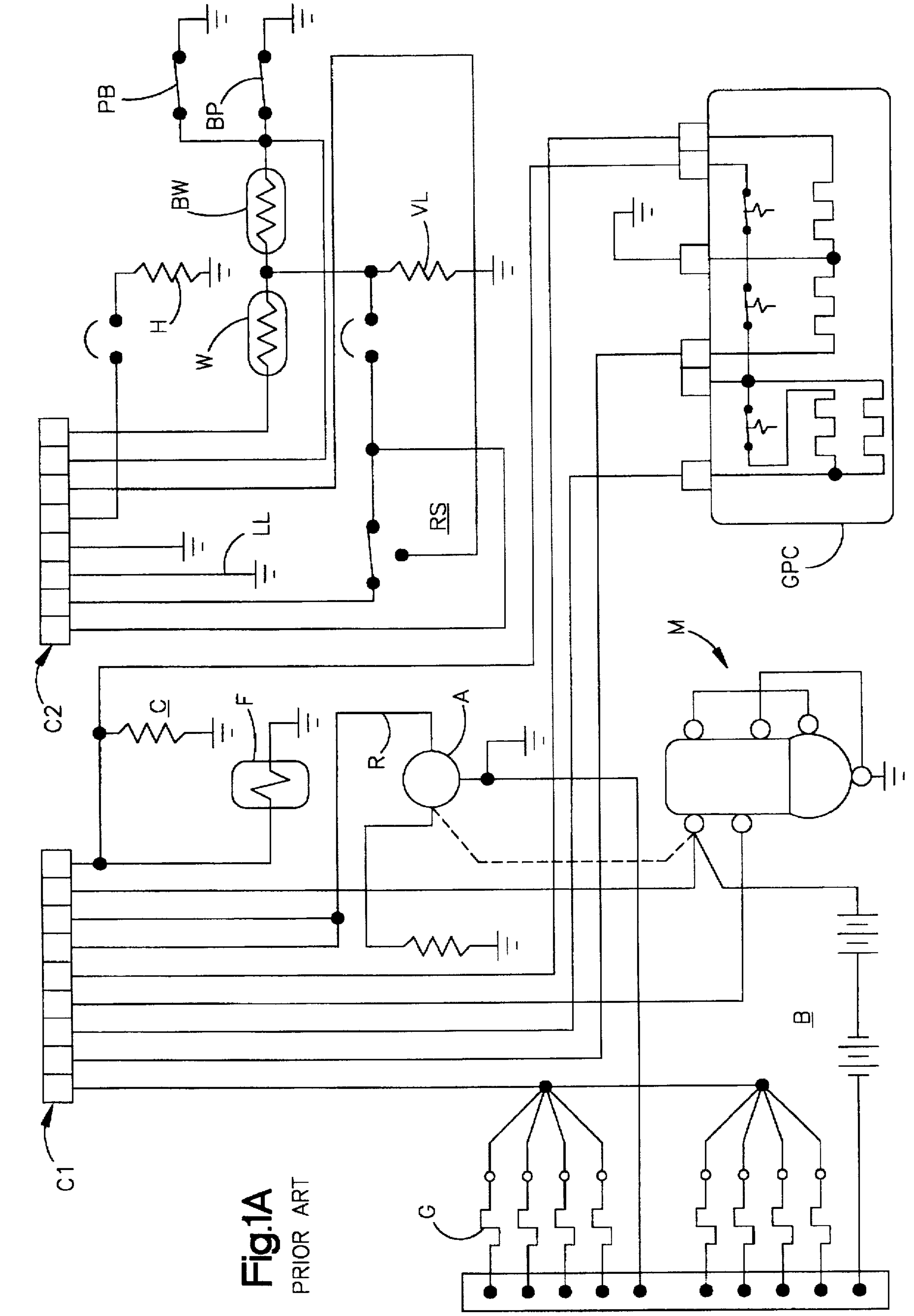
Fig.1A PRIOR ART
FIG. 1A is a partially schematic, partially block diagram illustrating some of the electrical components of a diesel engine and associated peripheral equipment which form the environment for the present invention.

The glow plug controller inputs and outputs are illustrated in accompanying schematic drawing FIGS. 11A through 11F, which are discussed in detail below. The system requires the following inputs and outputs:

Inputs a. A battery source 100, preferably 24 volts DC nominal, to power the glow plug control system. Two independent conductors connect battery power from the diesel engine starter motor.

b. A battery ground extends from the starter motor.

c. An ENABLE/OVERRIDE input 102 from a non-latching, normally open switch is actuated when desired by a vehicle operator. A control cycle is enabled by this input on the rising edge of a signal, low (less than 1 volt DC) to high (greater than 10 volts DC) transition. Additional enable signals received during the control cycle reset it on the falling edge, high (at least 10 volts DC) to low transition of the enable signal. This sequence is illustrated by the timing diagram of FIG. 1. The duration of the enable signal must be greater than 0.1 seconds. A manual override input is active while a high signal (greater than 10 volts DC) is present. The input shall sink less than 100 milliamperes (mA).

d. An ENGINE CRANK input 104 is provided by the starter solenoid. A low (less than 1 volt DC) to high (greater than 10 volts DC) signal transition marks the end of operator delay. (The operator is cranking the engine.) The controller then waits for the high to low transition, at which time the pre-glow period terminates, if the preglow period is in effect, and the after glow period begins. This input sinks less than 100 mA.

Figure 22:
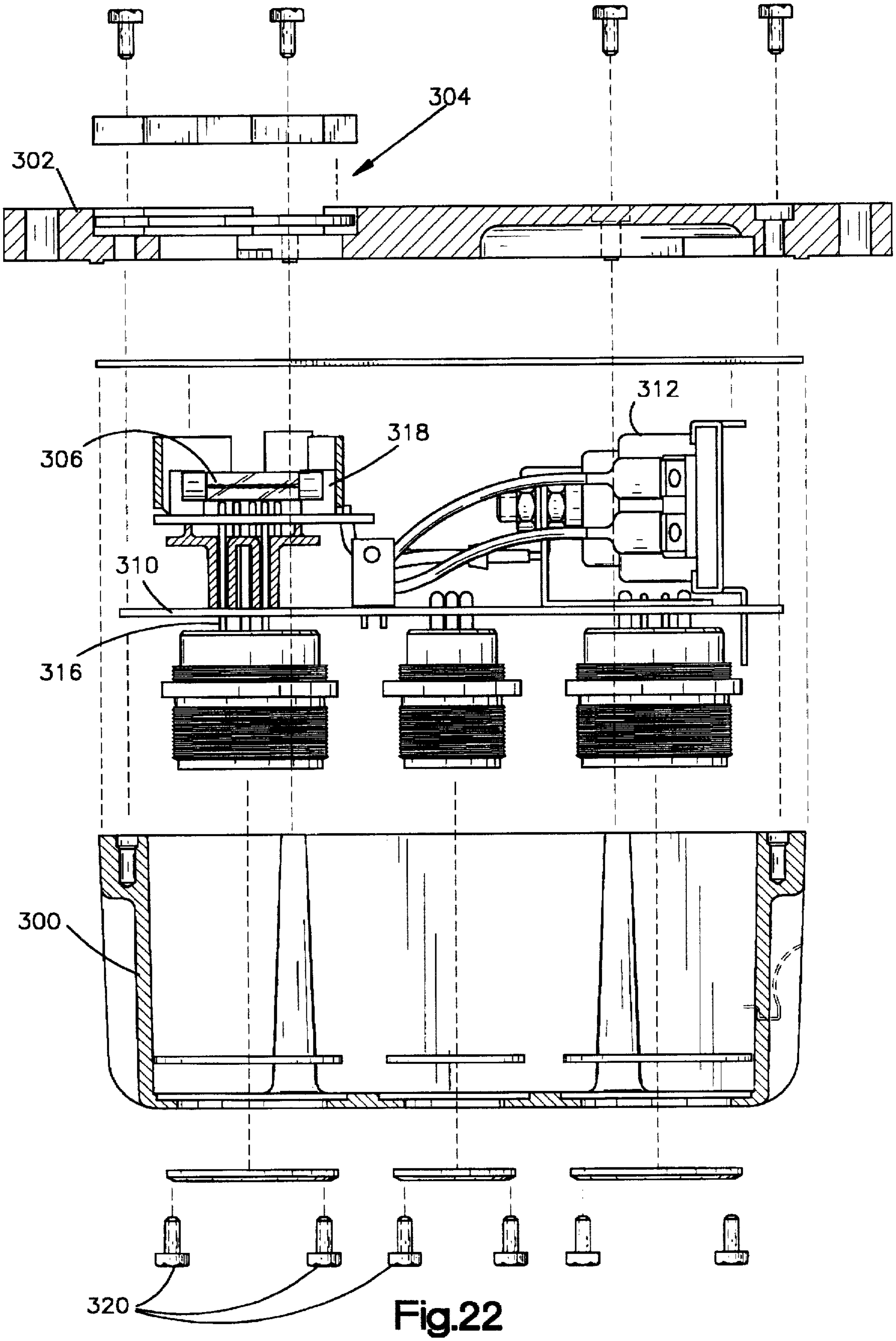

Outputs a. An output 106 shown in FIG. 11F provides signals which control the eight glow plugs G. When enabled, the output voltage is greater than battery voltage minus 1.5 volts DC, while sourcing 5.75 amps maximum to each glow plug (46 amps total). A single output relay 110 is provided to gate power to four pairs of glow plugs. Fuses 112 for each pair of glow plugs ensure the relay contacts and all other controller circuit paths are not damaged at continuous currents greater than 30 amps per group glow plug pair. The replaceable fuses 112 are accessed by removing a gasketed inspection plate (described below) located on a base of the unit, as shown in FIG. 22. When disabled, no current flows through the glow plugs.

b. An output 120 (FIG. 11C) controls an instrument panel mounted wait/pilot lamp. When enabled, the output voltage must be greater than battery voltage minus 1 volt DC, while sourcing 0.75 amps, maximum at 28 volts DC. When disabled, the output voltage is less than 1 volt DC with a leakage current of less than 1 mA with the lamp connected.

General Operation Summary

The glow plug controller system is enabled in response to the closure of a switch connected to the ENABLE/OVERRIDE input 102. After enablement, the following upgrading sequence occurs.

a. The controller GPC latches an internal five volt power supply in its "on" state and reads the engine temperature from an internal controller temperature sensor 122 (FIG. 11B) located in close proximity to a housing which encloses the controller. The controller then looks up the corresponding optimum pre-glow time from a table in memory, the memory comprising either an EPROM or a MASK. The range and resolution of the pre-glow time versus controller sensed temperature is illustrated in Table 1. The pre-glow time can be designated from 0 to 80 seconds with one second resolution for temperatures ranging from −40° Celsius to +50° Celsius in three degree increments.

TABLE 1

Range and Resolution of Pre-glow Time vs. Sensor Temperature and After-glow Time vs. Pre-glow Time

| TEMPERATURE (Degrees C.) | PRE-GLOW TIME (seconds) |
|---|---|
| −40 | 0–80 in whole secs. |
| −37 | 0–80 in whole secs. |
| −34 | 0–80 in whole secs. |
| −31 | 0–80 in whole secs. |
| −28 | 0–80 in whole secs. |
| −25 | 0–80 in whole secs. |
| −22 | 0–80 in whole secs. |
| −19 | 0–80 in whole secs. |

TABLE 1-continued

Range and Resolution of Pre-glow Time vs. Sensor Temperature and After-glow Time vs. Pre-glow Time

| | |
|---|---|
| −16 | 0–80 in whole secs. |
| −13 | 0–80 in whole secs. |
| −10 | 0–80 in whole secs. |
| −7 | 0–80 in whole secs. |
| −4 | 0–80 in whole secs. |
| −1 | 0–80 in whole secs. |
| 2 | 0–80 in whole secs. |
| 5 | 0–80 in whole secs. |
| 8 | 0–80 in whole secs. |
| 11 | 0–80 in whole secs. |
| 14 | 0–80 in whole secs. |
| 17 | 0–80 in whole secs. |
| 20 | 0–80 in whole secs. |
| 23 | 0–80 in whole secs. |
| 26 | 0–80 in whole secs. |
| 29 | 0–80 in whole secs. |
| 32 | 0–80 in whole secs. |
| 35 | 0–80 in whole secs. |
| 38 | 0–80 in whole secs. |
| 41 | 0–80 in whole secs. |
| 44 | 0–80 in whole secs. |
| 47 | 0–80 in whole secs. |
| 50 | 0–80 in whole secs. |

| PRE-GLOW TIME (seconds) | AFTER-GLOW TIME (seconds) |
|---|---|
| >0 | 0–120 sec. constant |
| =0 | 0 |

TABLE 2

Actual Pre- and After-glow Times

| TEMPERATURE (Degrees C.) | PRE-GLOW TIME (seconds) |
|---|---|
| −40 | 35 |
| −37 | 35 |
| −34 | 35 |
| −31 | 35 |
| −28 | 35 |
| −25 | 35 |
| −22 | 35 |
| −19 | 35 |
| −16 | 35 |
| −13 | 35 |
| −10 | 35 |
| −7 | 35 |
| −4 | 35 |
| −1 | 35 |
| 2 | 35 |
| 5 | 35 |
| 8 | 35 |
| 11 | 35 |
| 14 | 0 |
| 17 | 0 |
| 20 | 0 |
| 23 | 0 |
| 26 | 0 |
| 29 | 0 |
| 32 | 0 |
| 35 | 0 |
| 38 | 0 |
| 41 | 0 |
| 44 | 0 |
| 47 | 0 |
| 50 | 0 |

| PRE-GLOW TIME (seconds) | AFTER-GLOW TIME (seconds) |
|---|---|
| >0 | 60 |
| =0 | 0 |

The after glow time is a designated constant ranging from 0 to 120 seconds with one second resolution. The preglow and after glow times are accurate to within one second.

b. For all controller sensed temperatures equal to or less than 11° Celsius, the preglow time is 35 seconds, and the after glow time is 60 seconds. Above 11° Celsius, the pre-glow and after glow times shall be 0 seconds. Table 2 lists the chosen pre-glow and after glow table values.

c. The wait/pilot lamp is controlled for a one second bulb check before the glow plug relay is actuated.

Figure 2:
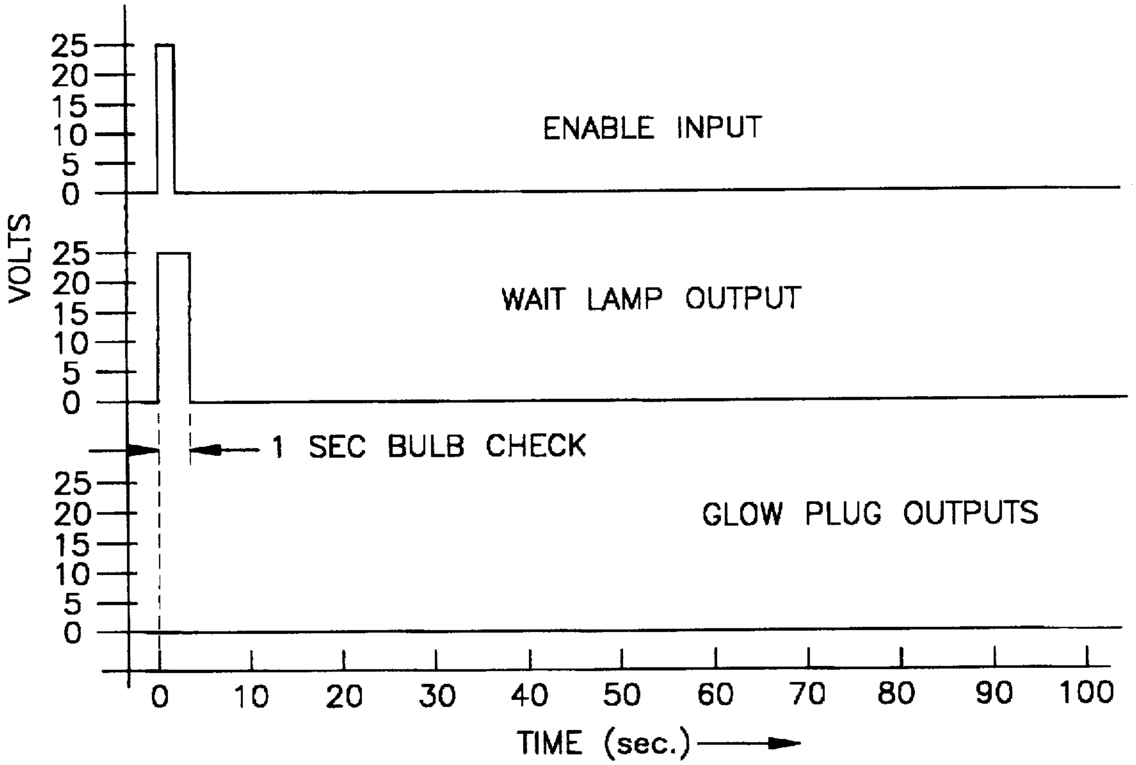
Figure 2A:
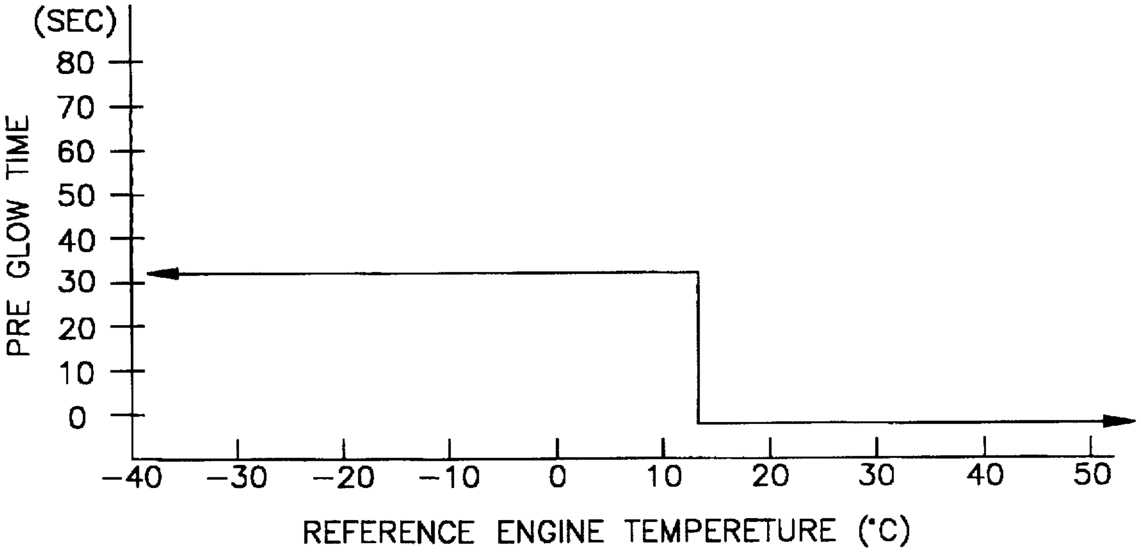
Figure 3:
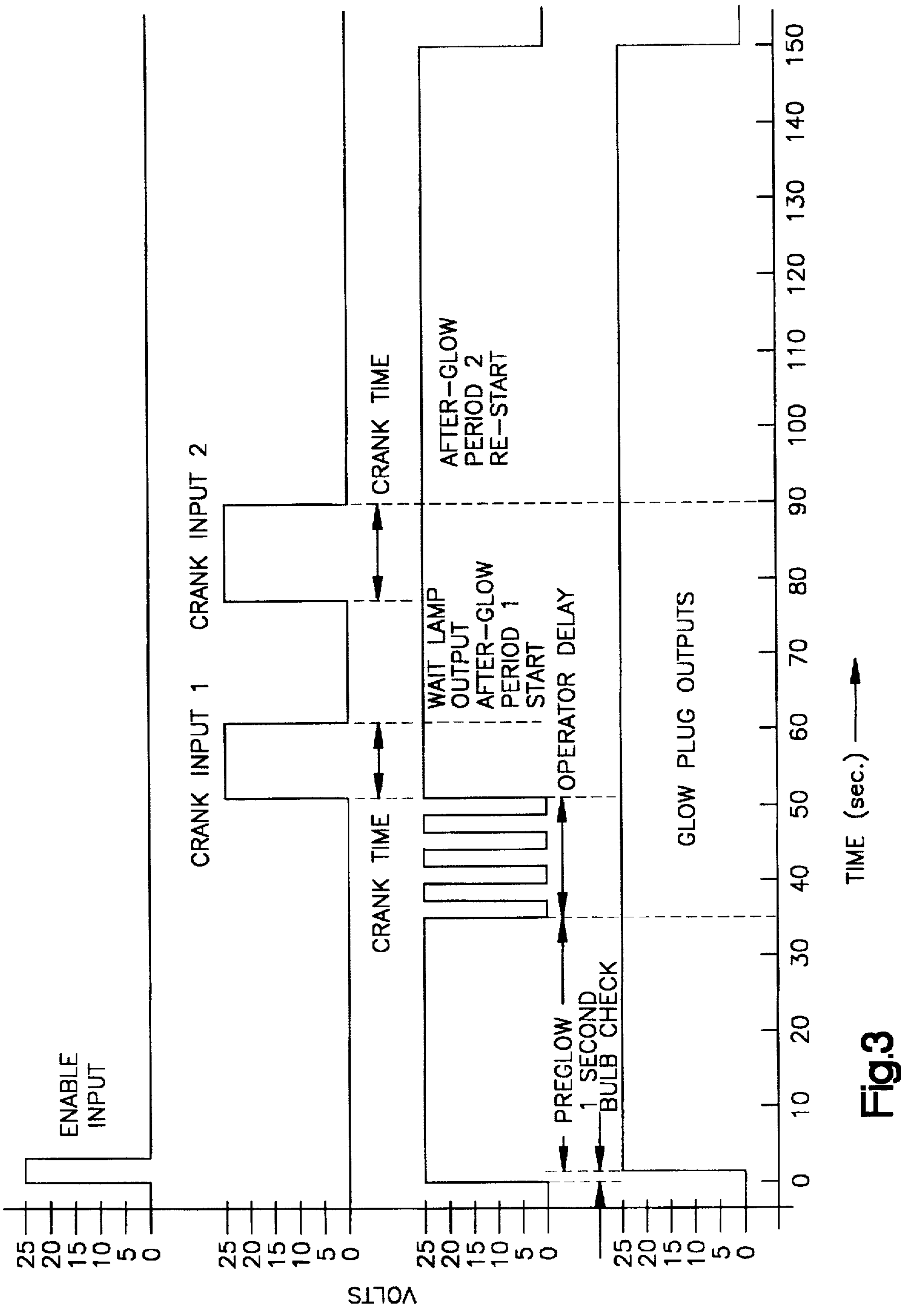
Figure 4:
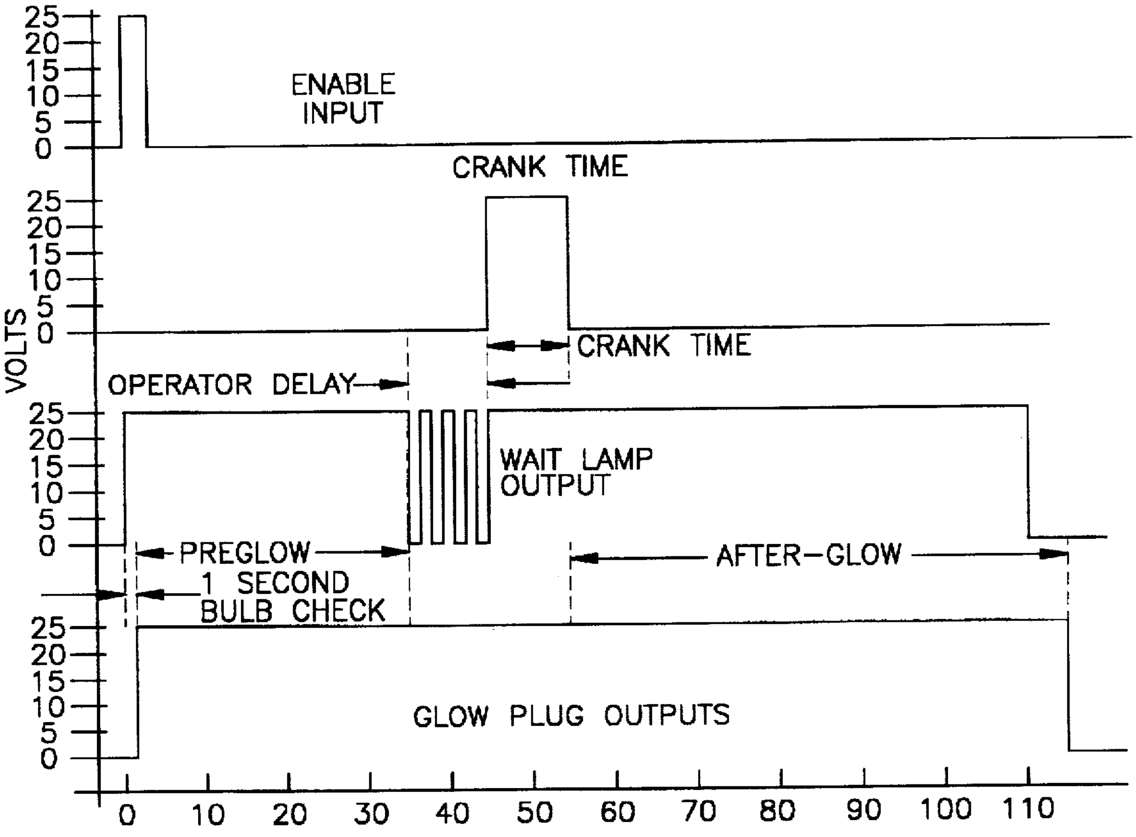
Figure 5:
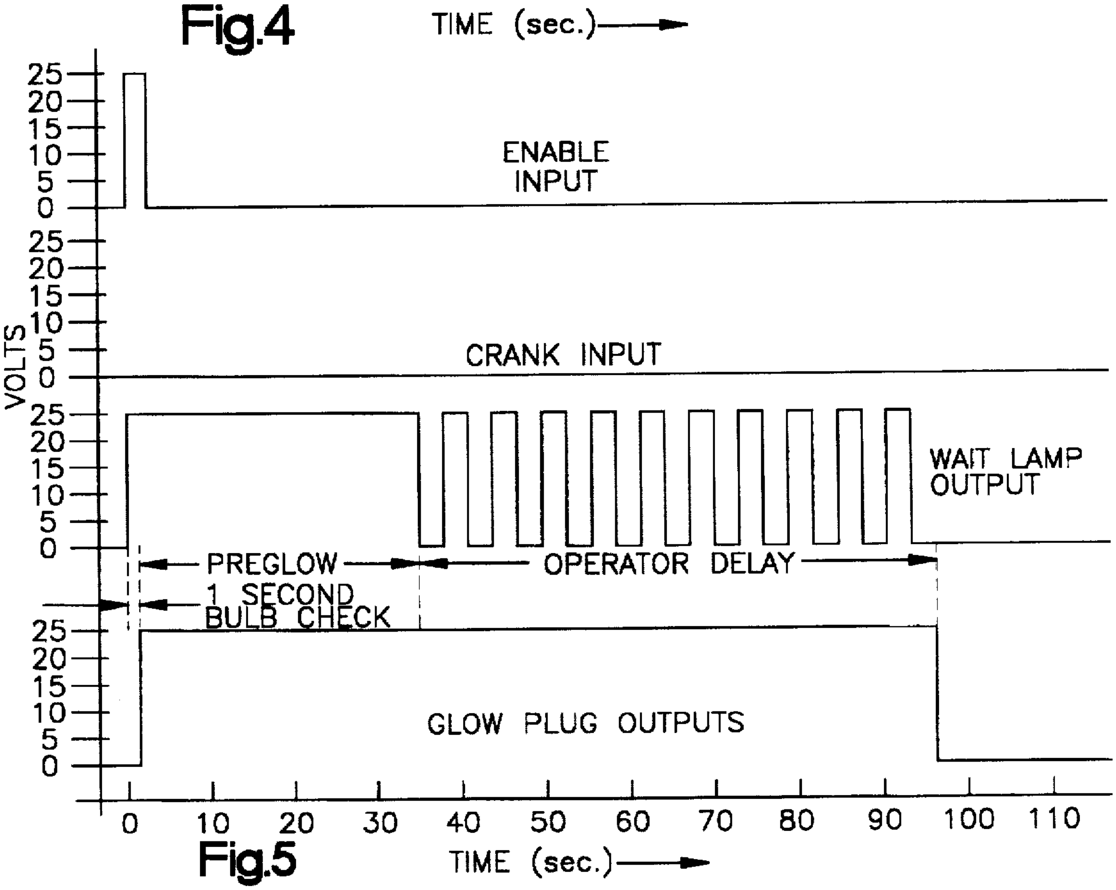

If the pre-glow time is 0 seconds, the power supply is toggled off at the end of the bulb check. This sequence is illustrated in the timing diagram of FIG. 2.

d. For pre-glow times greater than 0 seconds, the controller initiates the pre-glow period by enabling the glow plugs G and the wait/pilot lamp. The pre-glow period allows the glow plugs to reach their operating temperature. When the pre-glow time has expired, the wait/pilot lamp flashes at a 1 second±0.2 second repetition rate with a 50% duty cycle, prompting the operator to crank the engine. The operator delay is the time between the end of the pre-glow and the low to high transition of the crank input. The cranking period is the time that the cranking input is high. When a crank period is initiated, the wait/pilot lamp terminates flashing and resumes continuous operation. When the crank input undergoes a high to low voltage transition, the after glow period begins. Additional crank inputs received during after glow shall restart the after glow period on the falling edge of the crank input. This sequence is illustrated in a timing diagram of FIG. 3. The after glow period aids combustion when the engine is coming up to rated speed. The glow plugs will be disabled and the internal power supply toggled off when the after glow time has expired. The timing diagram of FIG. 4 illustrates this sequence for 35 seconds of pre-glow, 10 seconds of operator delay, 10 seconds of cranking and 60 seconds of after glow.

e. The maximum allowable operator delay between the end of the pre-glow and the beginning of the crank period shall be a programmable constant ranging from 0 to 120 seconds with 1 second resolution. It is most preferably set to 60 seconds. If no crank input is received during the 60 seconds, then the controller disables the glow plugs, the wait/pilot lamp, and the internal power supply. This response is illustrated in FIG. 5.

Figure 6:
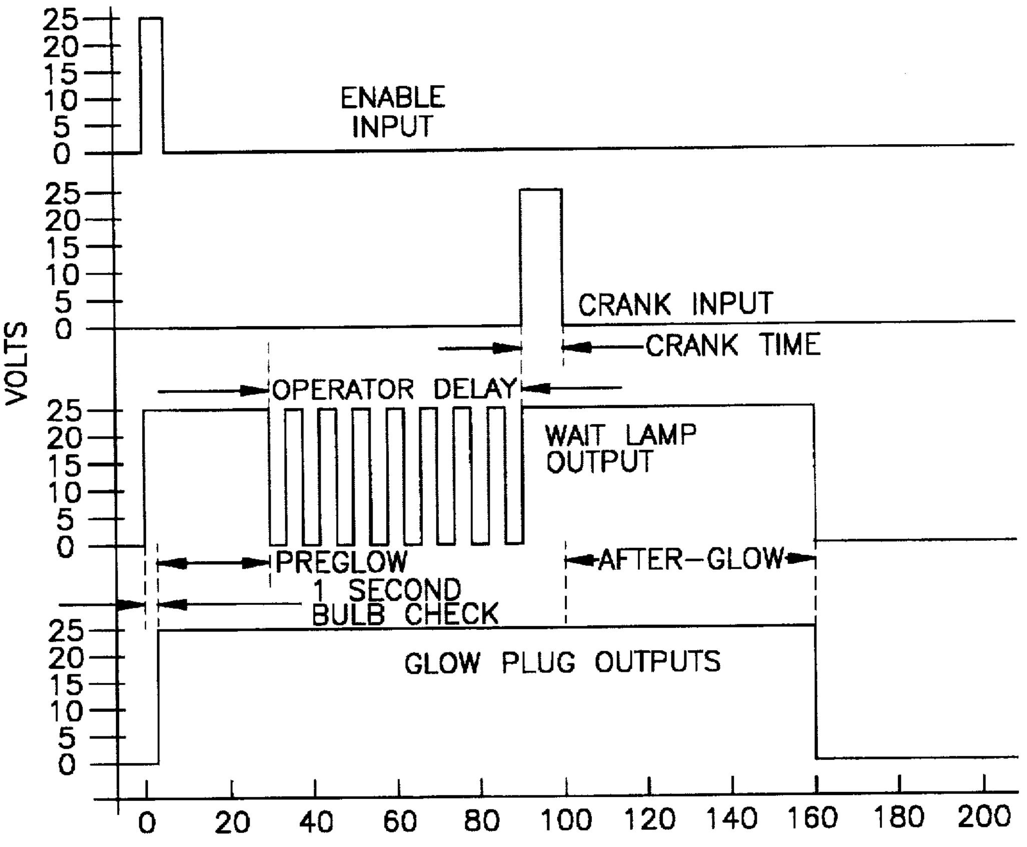
Figure 7:
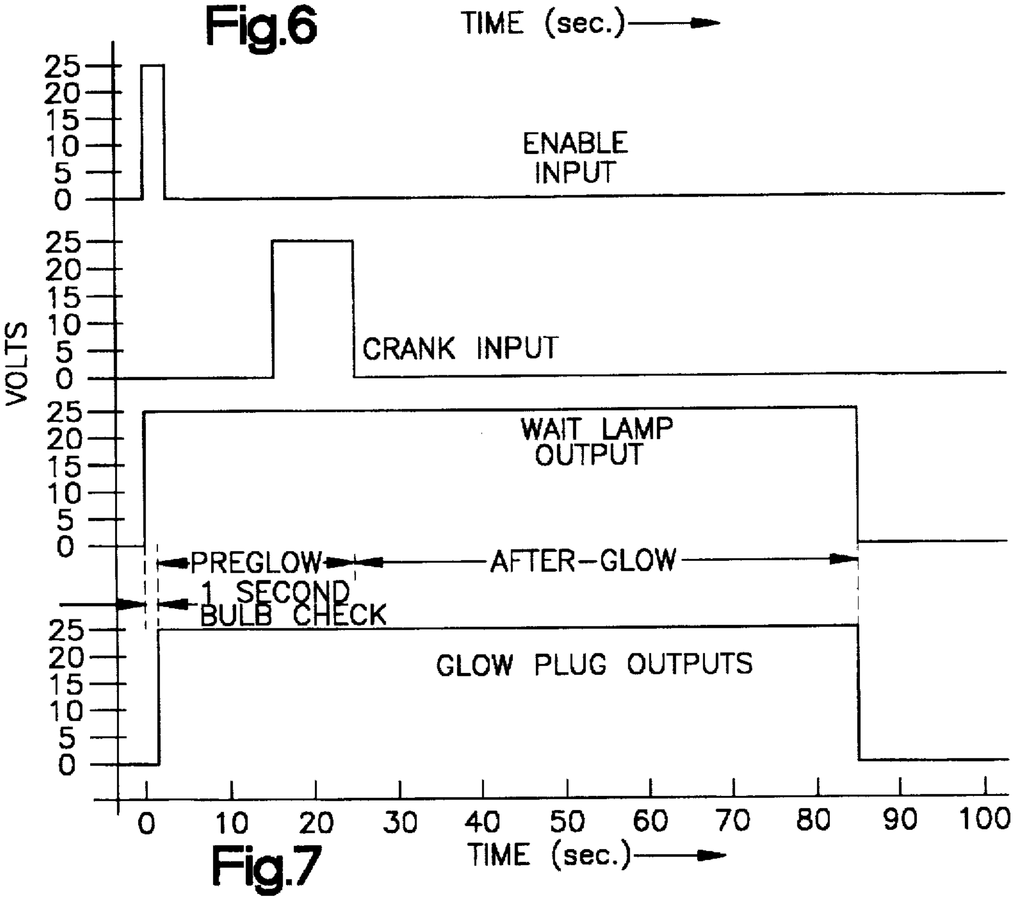
Figure 8:
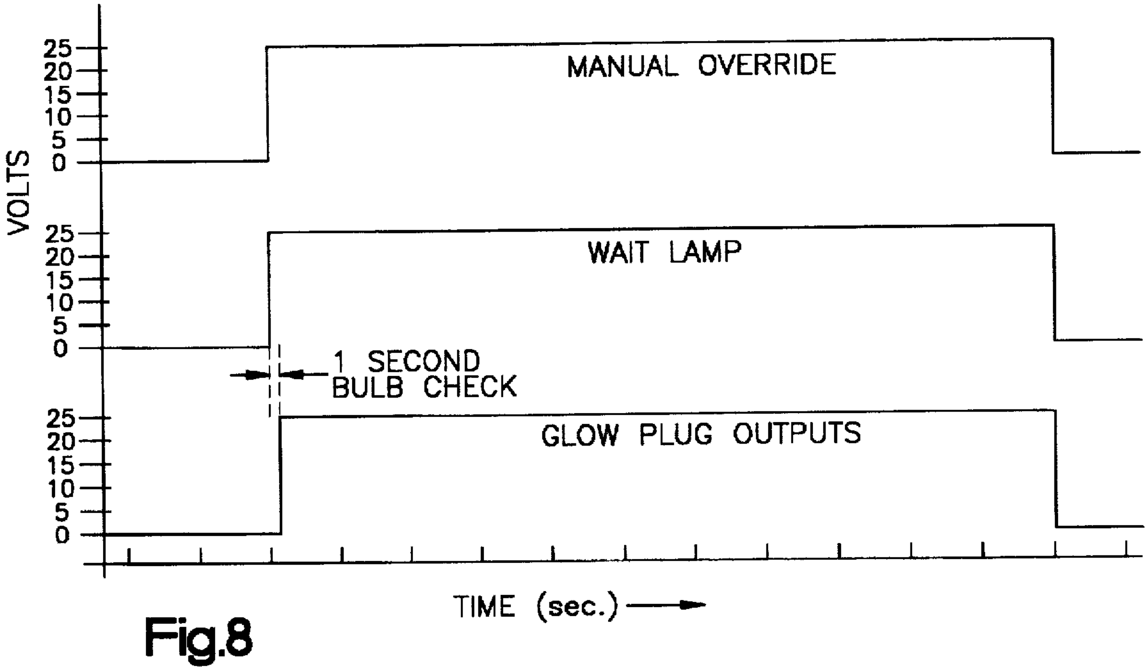
Figure 9:
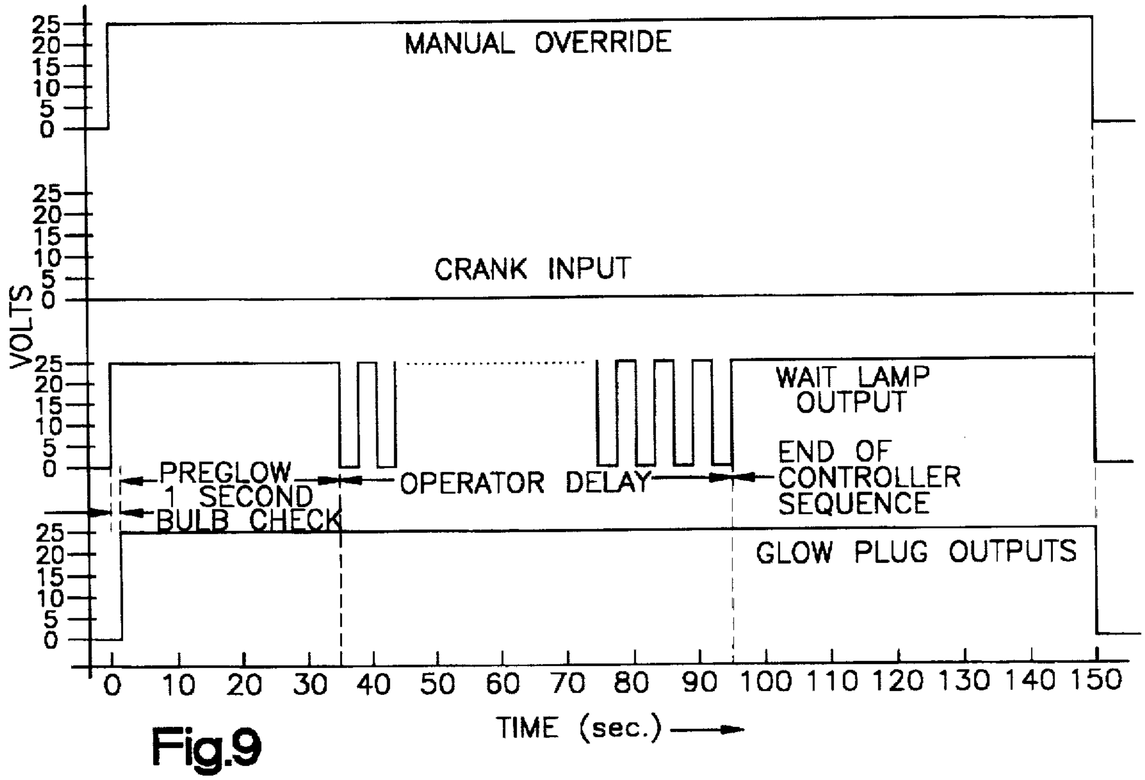
Figure 10:
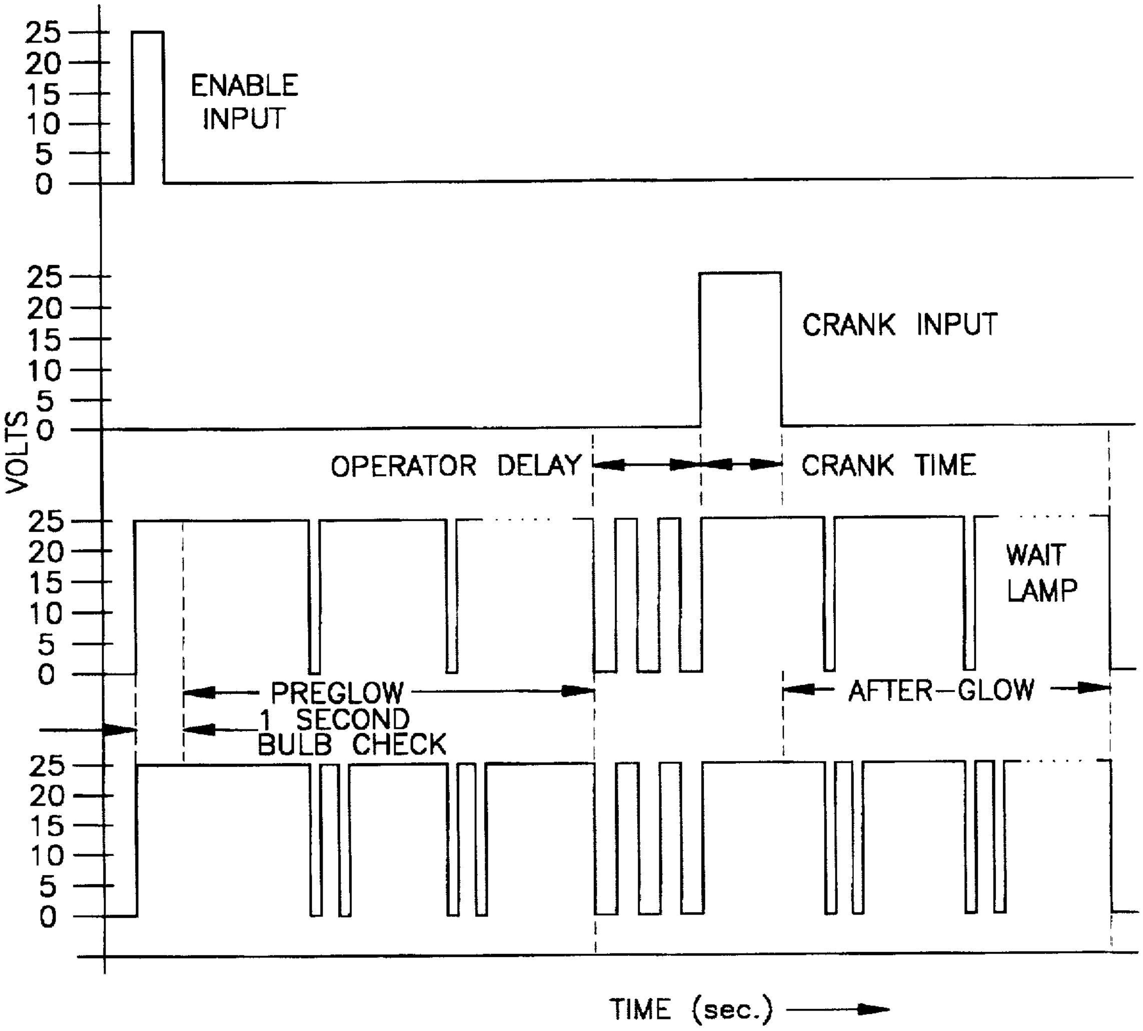

If the crank input undergoes a low to high transition during the operator delay, the controller waits for the crank input high to low transition, after which the after glow period is initiated. This sequence is illustrated in FIG. 6.

f. If the crank input 104 is received during the pre-glow period, the pre-glow shall immediately terminate, and the after glow period shall begin as illustrated in FIG. 7.

g. The controller is activated by an ENABLE input 102 signal of 10 volts DC or greater. If the input voltage decreases to 8 volts during the control cycle, the glow plug relay does not drop out and the controller shall not be caused to reset.

h. The wait/pilot lamp operation is directly dependent upon relay operation. The lamp will be lit whenever the relay contact is closed and one or more of several fuses 112 provides continuity. The lamp is off whenever all the fuses are open and/or the relay itself is open, except during a bulb check mode. The result is a lamp/relay interaction with the operator delay flash and the bulb check and relay/fuse diagnostic modes.

i. The manual override mode takes precedence over microprocessor functions, allowing direct operator control of the glow plugs at controller temperatures below 85° Celsius. One second after continuous activation of the operator enable/manual override switch, both the control cycle and manual override are simultaneously enabled. This sequence is illustrated in FIG. 9. If the switch is released prior to cycle completion, the microprocessor will complete the cycle before toggling the internal power supply. If the microprocessor is not functional, or the controller sensed temperature is in the range of 11° Celsius to 85° Celsius, the enable/override switch provides an emergency backup feature which enables the internal power supply and glow plugs while closed. An illustration of manual override for temperatures greater than 11° Celsius, but less than 85° Celsius, is provided in FIG. 8.

j. At controller temperatures below 11° Celsius, the relay/fuse diagnostic mode is active during both the preglow and afterglow periods. The diagnostic routine monitors the glow plug connector pins to determine whether the relay 110 or any of the fuses 112 are not operational. If one, two or three of the four fuses fail to source current, an error code is output via the wait lamp. The code alerts the operator that a malfunction exists and conveys the number of failed circuits. The code flashes one time per each failed circuit. The flash rate is 0.2 seconds off and 0.3 seconds on, with a three-second lamp-on period preceding the sequence. The error output will be repeated until termination of preglow and/or afterglow periods. The relay/fuse diagnostic routine is illustrated in FIG. 10.

The Power Supply

Input power transient protection and EMI filtering (FIG. 11A) are provided by a metal oxide varistor (MOV) indicated at reference character RV1, along with capacitors C24 and C37, an inductor L1 and a zener diode D12. A diode D7 provides reverse polarity protection in the event the vehicle battery is accidentally connected backward.

Transistors Q3, Q4 form a pre-regulator, reducing the input voltage to a five volt voltage regulator indicated at reference character U3. A zener diode D6 sets the pre-regulator output to 7 volts. The regulator U3 provides 5 volts at its output, so the regulator U3 has only two volts dropped across it which allows the use of a small non-heat-sinked transistor regulator.

Capacitors C5 and C201 provide noise filtering for the 5 volt supply.

Current for a pre-regulator zener diode D6 is provided by a transistor Q5, which is under the control of a transistor Q6. At turn-on, a voltage from a vehicle enable/override switch appears at an input designated ENABLE/OVERRIDE 102 in FIG. 11A. This voltage is filtered by a capacitor C22 (which also protects against ESD.) A diode D10 constitutes a blocking diode whose function is described below.

An incoming enabling voltage is regulated by a resistor R42 and a zener diode D8, and is applied to a Vcc terminal (via D31, See FIG. 11C) of an integrated circuit comparator U2*a*, which is located in a lamp driver and control circuit 130 to be described in more detail below.

An integrated circuit comparator U2*c*, that shares a common substrate with the integrated circuit U2*a* is also powered up. A voltage from the point designated ENABLE/OVERRIDE 102 is fed through a resistor R43 to a point indicated as ENABLE SENSE (see FIG. 11A). This voltage is then fed round about, via a resistor R47, a diode D27 and a diode D26 to the output of the integrated circuit U2*c*, and then to a base of the transistor Q6. The transistor Q6 then turns on, in turn allowing the transistor Q5 to turn on. The preregulator/regulator circuits become powered, delivering +5 volts to a microprocessor U1, described in more detail below.

The microprocessor then verifies the ENABLE/OVERRIDE input 102 and the temperature. If the temperature is 11° Celsius or less, the microprocessor energizes an output 134 indicated by the designation POWER LATCH (see FIG. 11D). The transistor Q6 is then held on by way of a diode D9 and a resistor R41 that couple this output to the base of the transistor.

The output of the transistor Q5 is also applied to a field effect transistor Q7 and a field effect transistor Q11 (See FIG. 11F), which function as relay drivers to enable relay turn-on. Thus, holding down the ENABLE/OVERRIDE switch will energize a glow plug relay 110 even if the microprocessor system becomes inoperative and fails to latch power on.

Figure 12:
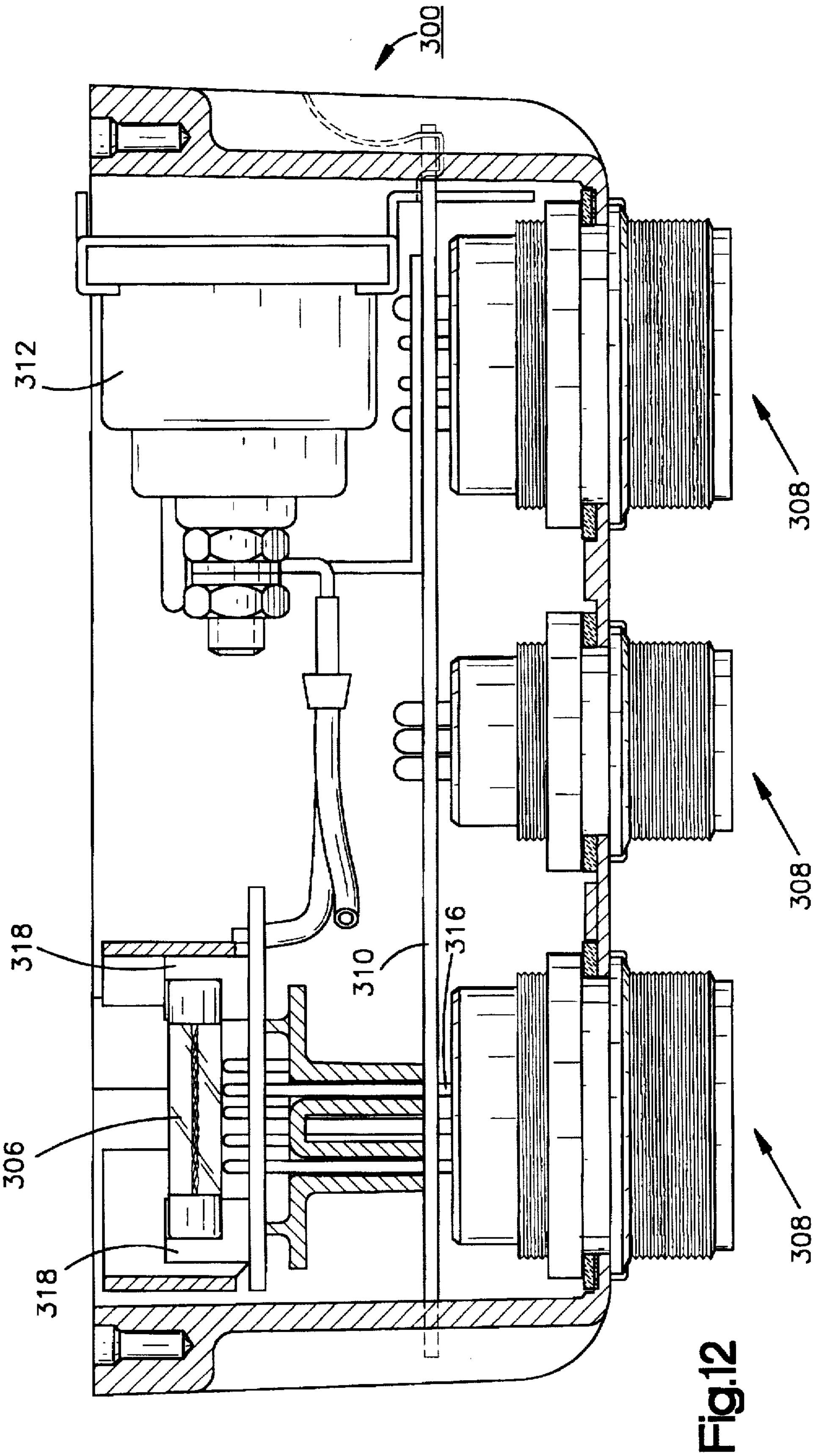
FIGS. 12 through 22 are mechanical drawings illustrating mechanical features of the present invention.
Figure 13:
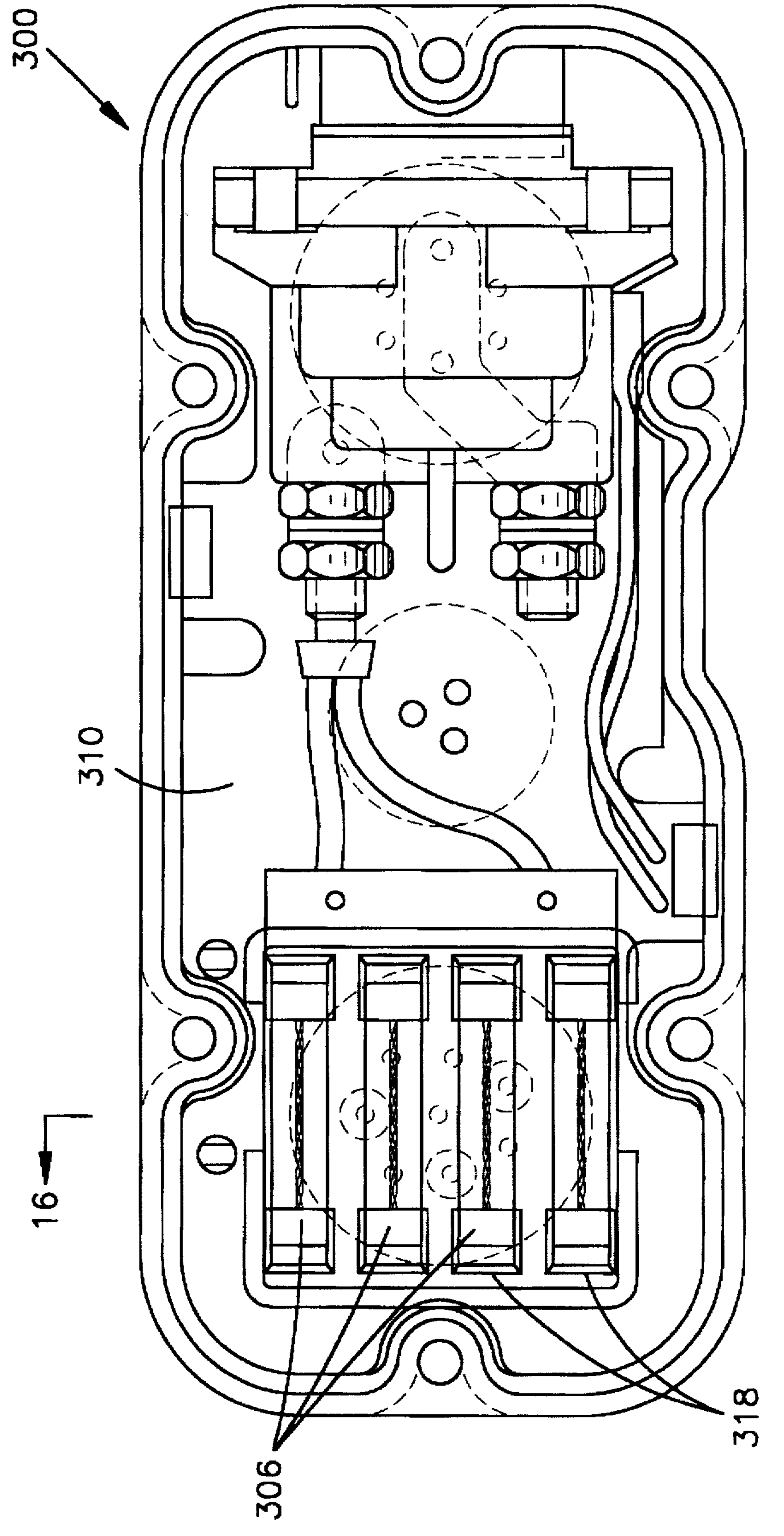
Figure 14:
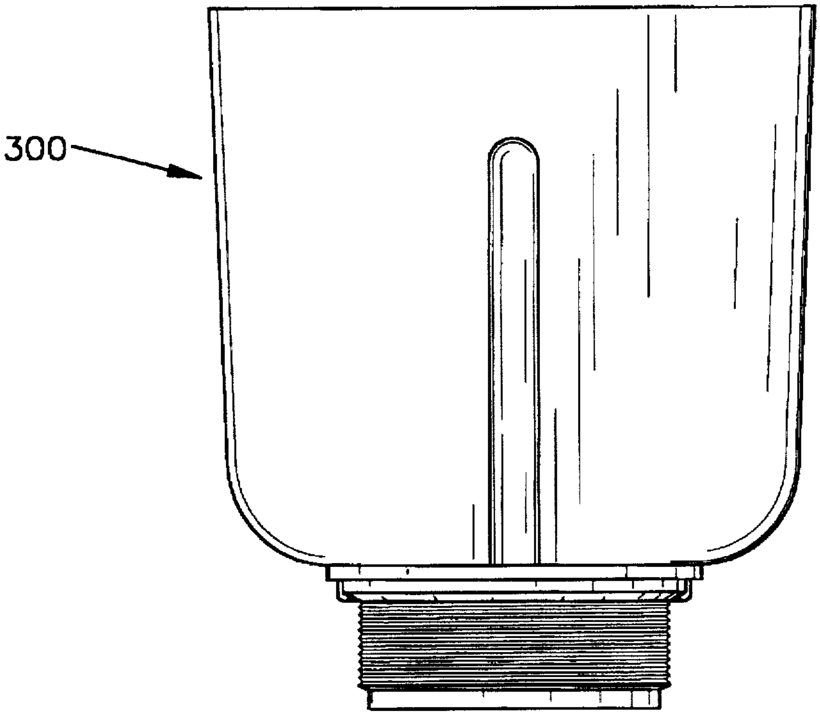
Figure 15:
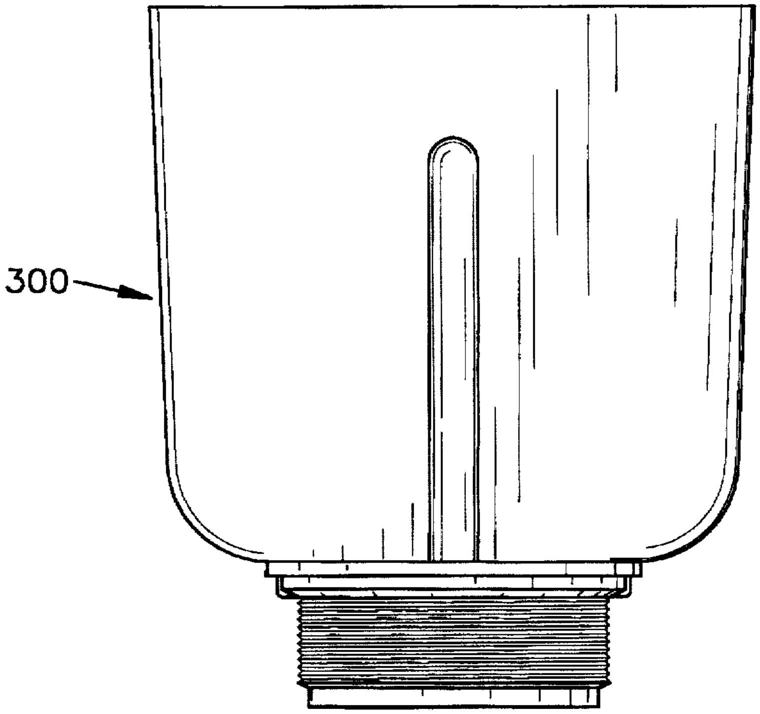
Figure 16:
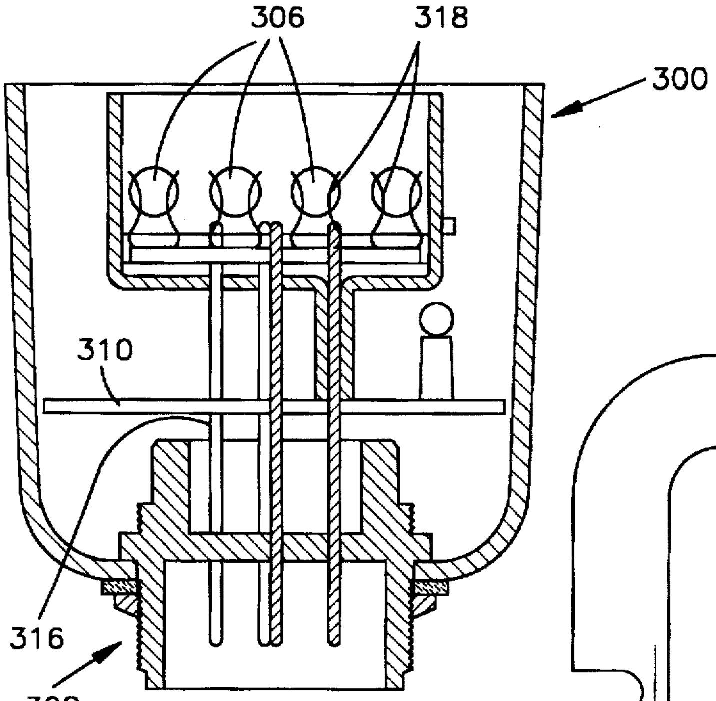
Figure 17:
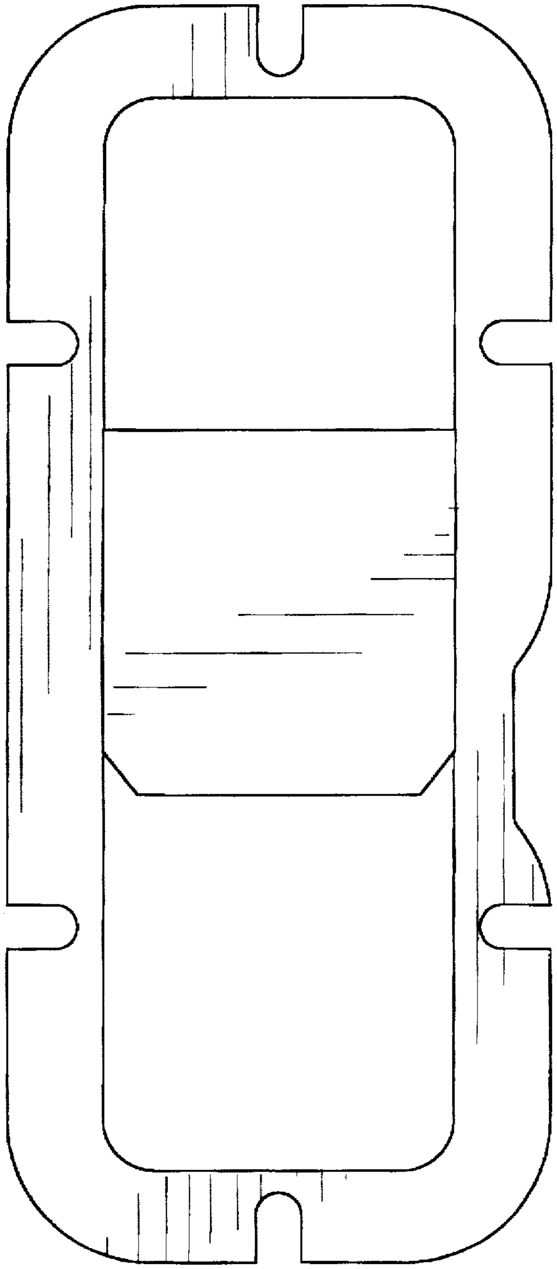
Figure 18:
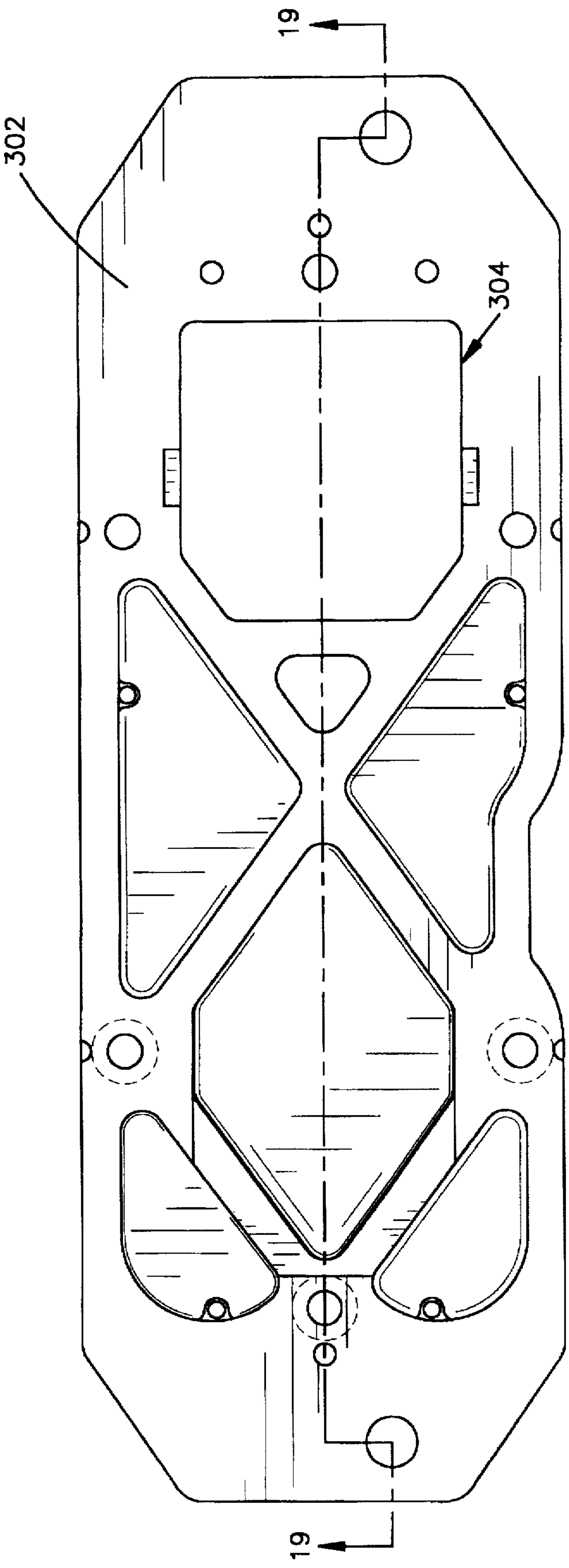
Figure 19:
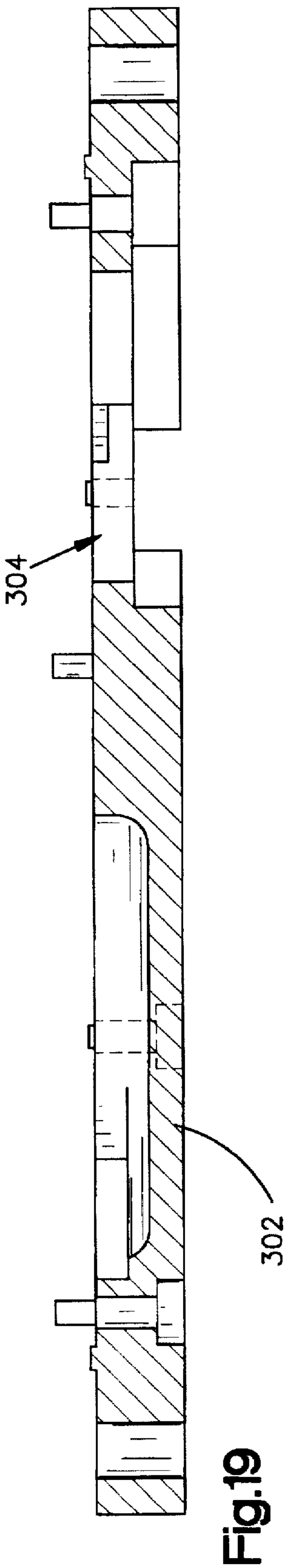
Figure 20:
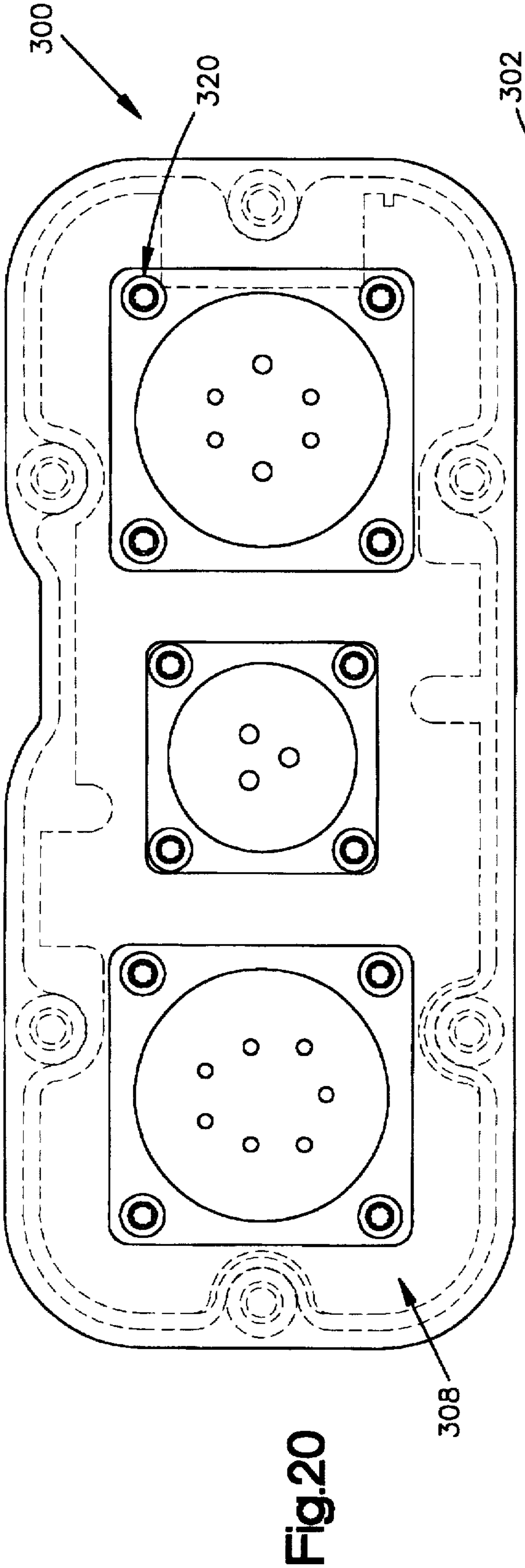
Figure 21:
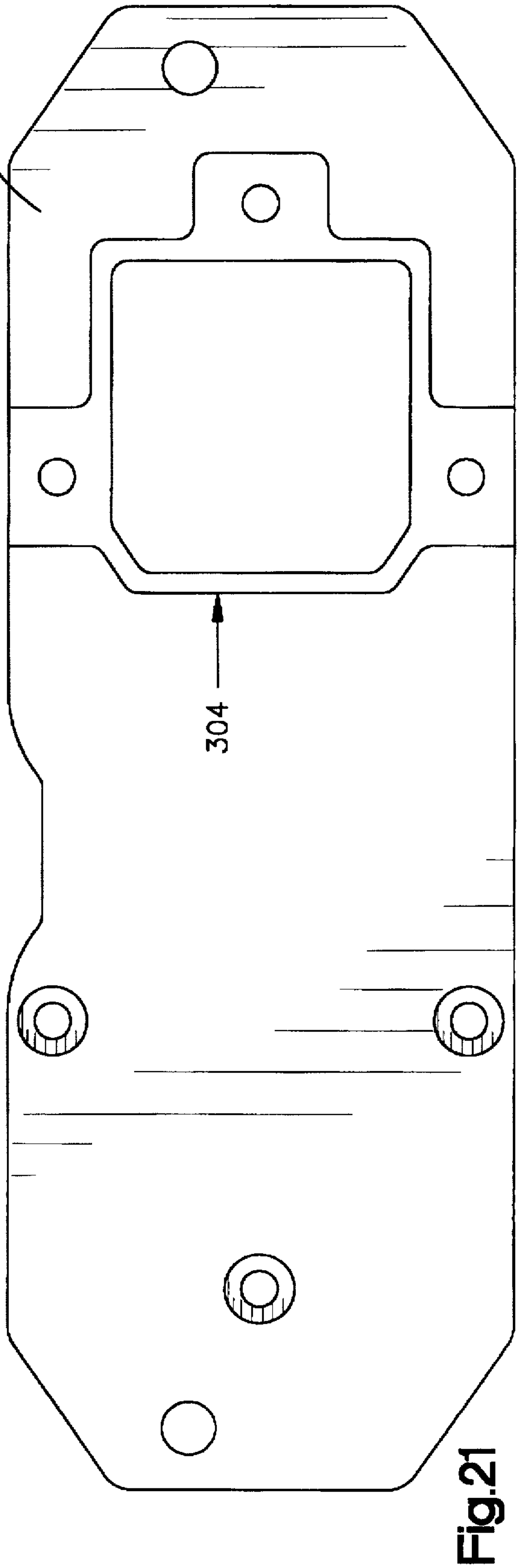

The vehicle battery voltage is monitored by a comparator U2*d* designated OVERVOLTAGE (see FIG. 12A). Battery voltage is scaled by resistors R37 and R38, and is applied to inverting input of the comparator U2*d*.

A reference voltage is derived from a zener diode circuit including a resistor R42 and a diode D8. Reference voltage is scaled by a voltage divider formed by the resistors R40, R39 and is applied to a non-inverting input of the comparator **U2*d***. Should battery voltage exceed a safe level (approximately 33 volts) the output from the comparator U2*d* goes low. Hysteresis is provided by positive feedback resistor R46 to prevent oscillation. The comparator output is sensed by a microprocessor interrupt input designated IRQ (FIG. 11D), which initiates immediate turn-off of the power latch. A diode D29 then clamps the voltage at a node designated N6 to a level insufficient to forward bias diodes D27 and D26. The transistor Q6, in response, turns off, which drops the transistor Q5, turning off the relay.

This arrangement ensures that the manual override cannot energize the relay during an overvoltage condition.

An OVER TEMPERATURE monitor uses an NTC-type sensor at a non-inverting input and a reference voltage at the inverting input of the comparator U2*c*. Hysteresis is provided by a positive feedback resistor R12 to prevent oscillation. When a temperature of 85° Celsius or greater is sensed, the output from the comparator U2*c* output goes low. This pulls the base of the transistor Q6 low and prevents the power supply from becoming enabled. The manual override function is thus disabled as well since operation of the glow plugs is not needed at these higher temperatures.

A/D Conversion

In order that the microprocessor can read the temperature sensor input signal, a conversion of the analog temperature signal to digital information is needed. The sensor 122 (FIG. 11B) is connected in series with a resistor R20 across the 5 volt power supply. As the sensor resistance varies with temperature, the voltage appearing at a non-inverting input of an operational amplifier U4*b* will vary. An operational amplifier U4*a* and a transistor Q1 together form a constant current source which allows a capacitor C9 to charge at a linear rate. The instantaneous voltage across the capacitor C9 is applied to the inverting input of the operational amplifier U4*b*. In operation, a transistor Q2 is caused to conduct due to an output 140 from the microprocessor U1. This discharges the capacitor C9.

At time 0, the transistor Q2 turns off and the capacitor C9 begins to charge. The microprocessor begins incrementing an internal timer. At some point, the decreasing capacitor voltage falls below the sensor derived voltage, and the operational amplifier output goes high. This signals the microprocessor to stop incrementing the internal timer.

The microprocessor timer count is a direct function of voltage at the non-inverting input of the comparator U46. This voltage, in turn, is a function of the temperature of the sensor 122.

The microprocessor then causes the transistor Q2 to again conduct, discharging capacitor C9 to begin another temperature measuring cycle.

The Microprocessor

Most timing and control functions are performed by the microprocessor. The engine temperature is input by way of the analog to digital converter circuitry, and the preglow interval is begun. A signal from the crank input 104 causes timing to shift to the afterglow interval.

The instrument panel lamp is controlled to signal the vehicle operator of the controller states of operation, namely, preglow, time to crank, afterglow, and a diagnostic signal to indicate blown fuses.

A two MHz. resonator 142 provides frequency control for the internal clock oscillator of the microprocessor. An input with a large ratio voltage divider is connected to a port which is designated by reference character PB5. A test input 144 (FIG. 11B), requires 120 volts to be applied in order that sufficient voltage is available at a divider output 146 defined by resistors R74 and R75 in order that they constitute a high at the port PB5.

This input is not a user input. It is designed to allow production facility testing at temperatures higher than 11° Celsius. This signal voltage is not readily available in the field, but could be used by personnel at a vehicle service facility. This function is transparent to the vehicle operator.

Note that transistor pairs are connected to all ports of the microprocessor which are in any way connected to outside circuits. A group of transistors Q13–Q28 form bi-polar transient protector/clamps which protect the microprocessor ports from overvoltage or reverse voltage.

These clamps prevent voltages above +5 volts or below ground from reaching the microprocessor. Normal transient protection would use diodes across each input. Such a diode configuration would permit the voltage on a port to exceed +5 or drop below ground by a diode drop, which is 0.7 volts.

The specification on the CMOS microprocessor calls for clamping at a voltage not to exceed 0.5 volts beyond +5/ground. Consequently, "active" clamping circuits are employed.

Figure 11A:
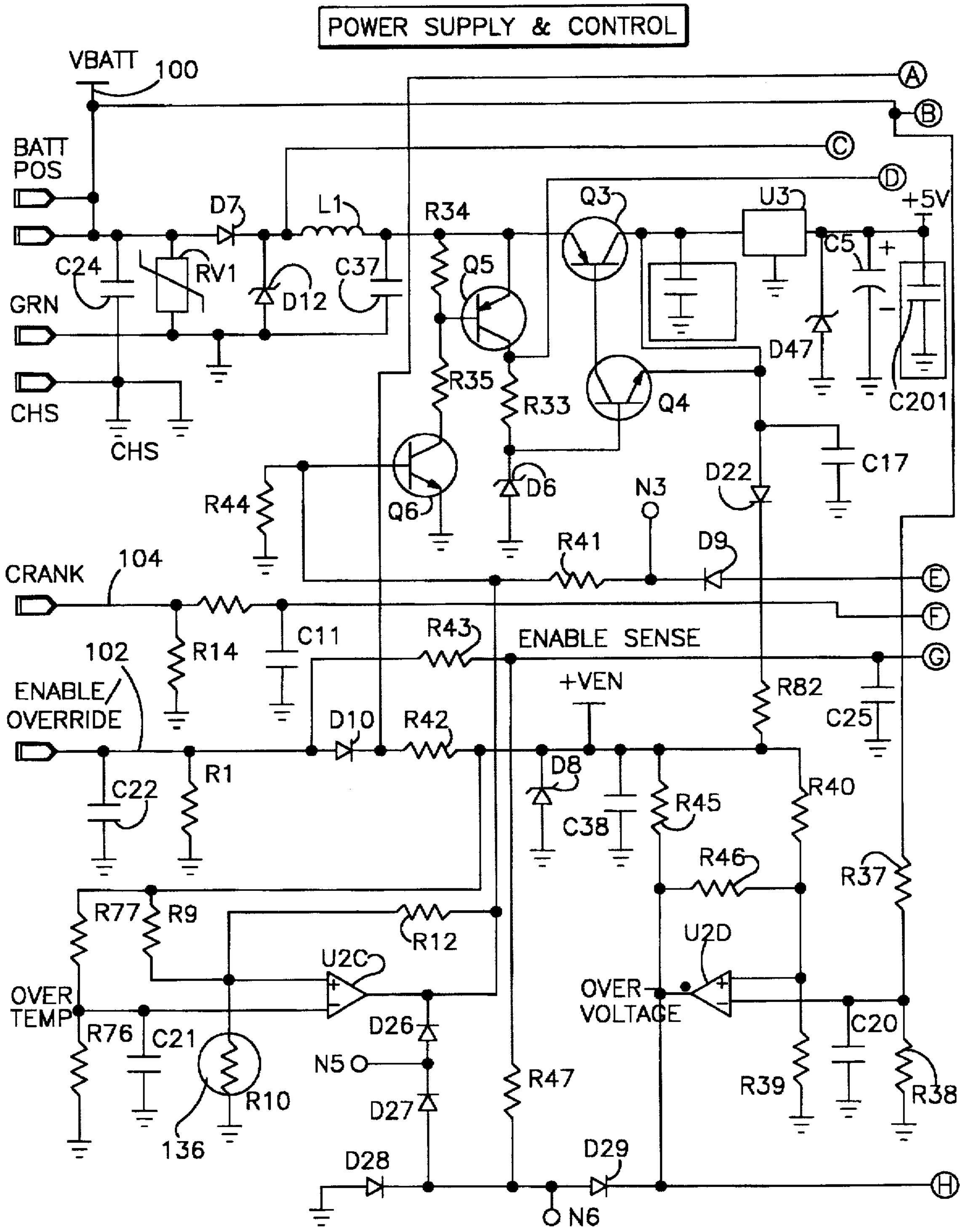
FIGS. 11A–11F together constitute a schematic drawing of the circuitry of a preferred embodiment of the present invention.
Figure 11B:
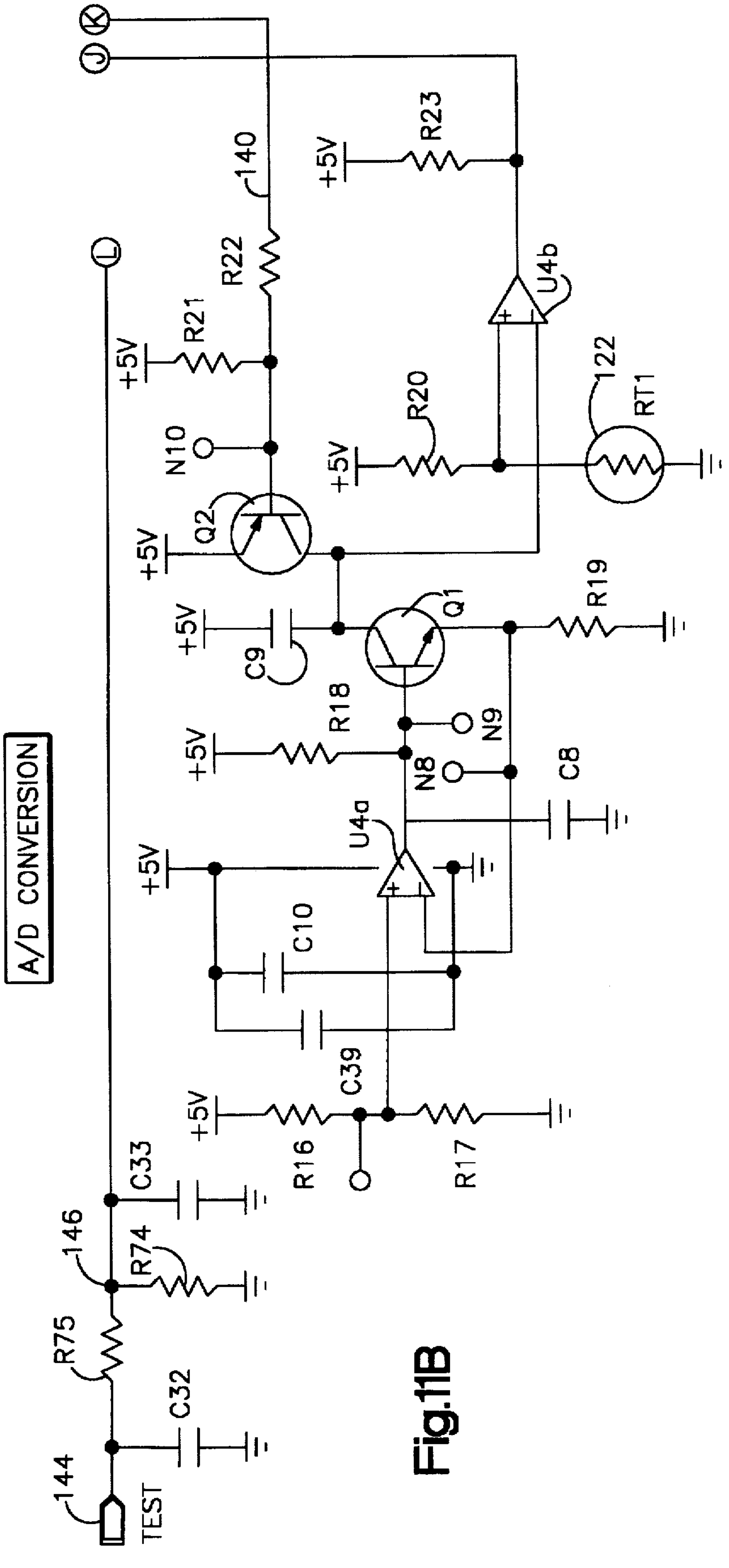
Figure 11C:
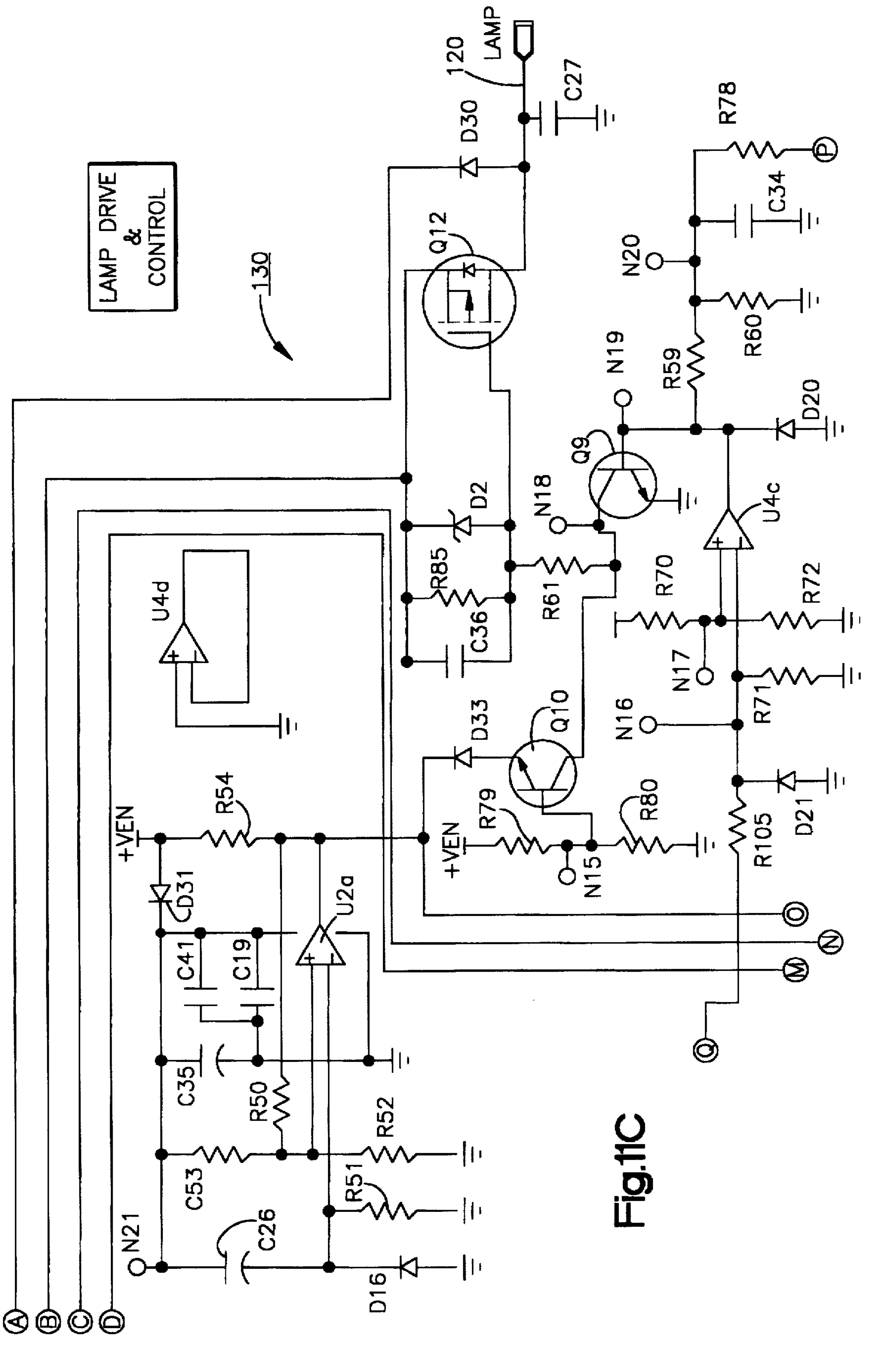
Figure 11D:
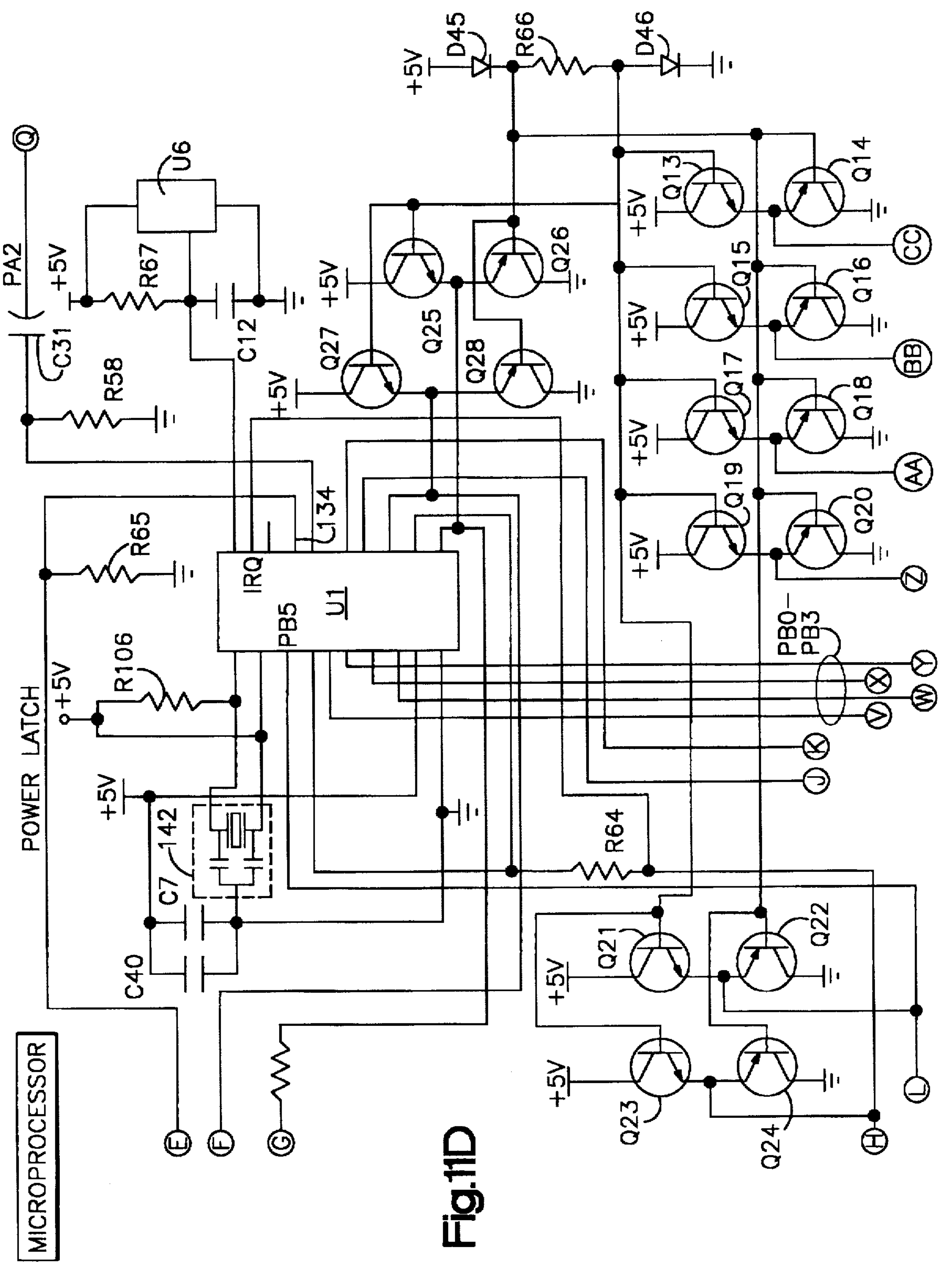
Figure 11E:
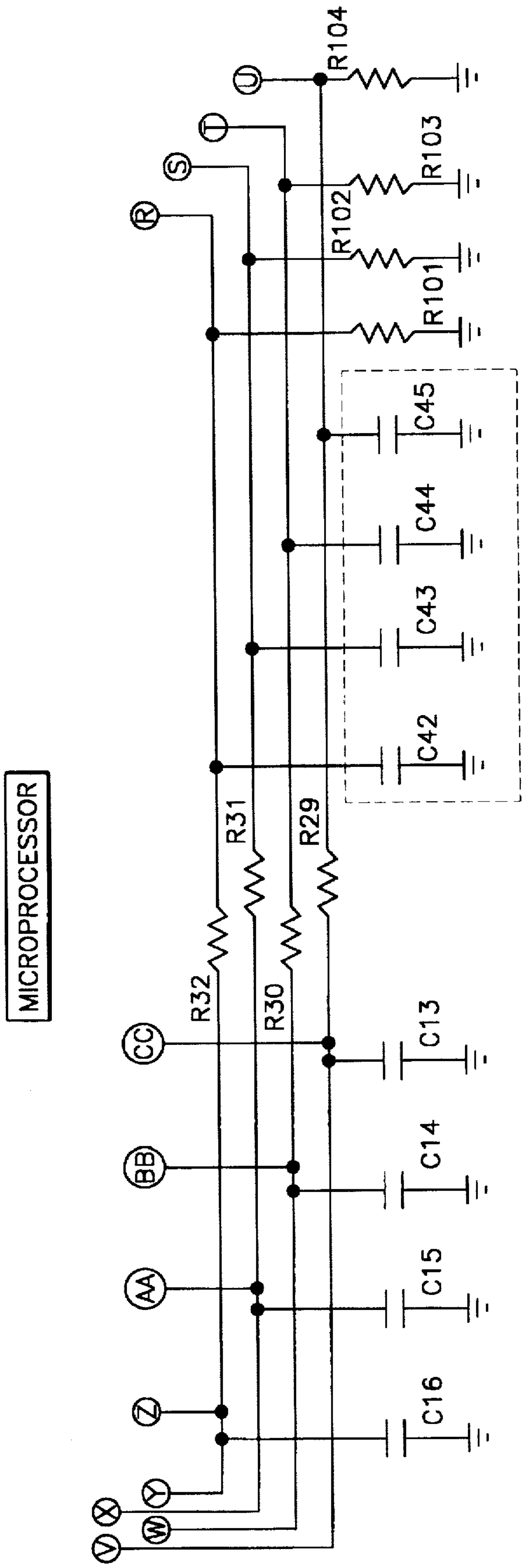
Figure 11F:
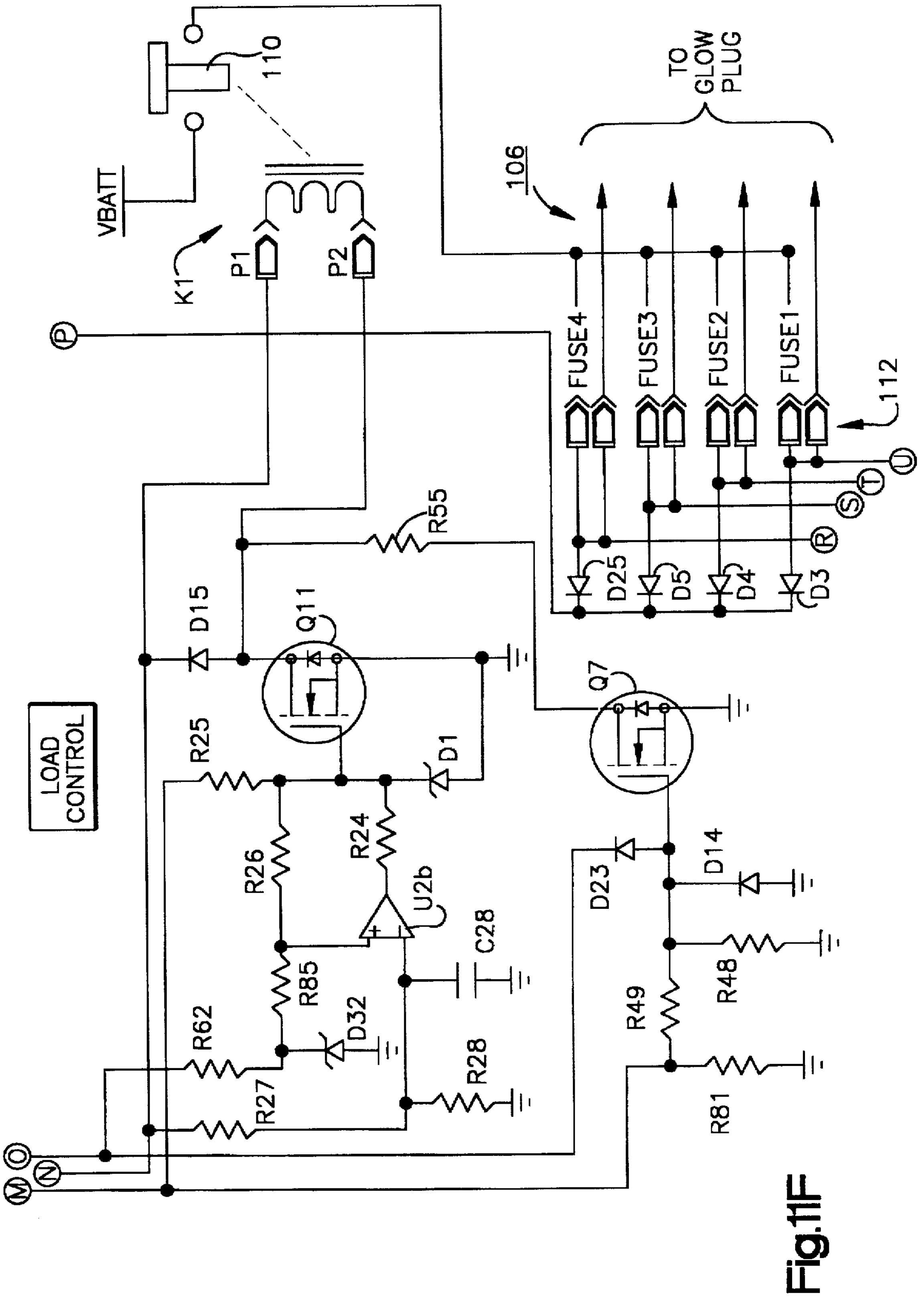

As an example, attention is invited to the transistor pair shown in FIG. 11D including transistors Q13 and Q14. Note that a base of Q13, an NPN transistor, is held at one diode drop above ground by a diode D46, while the NPN transistor Q14 base is held one diode drop below +5 volts by a diode D45. In operation, if the emitter of the transistor Q13 goes to ground, an emitter-base junction voltage of 0.7 volts occurs due to the voltage across the diode D46. If the emitter of the transistor Q13 tries to go below ground, the transistor Q13 goes into conduction clamping the emitter to ground. Similarly, if the emitters of these two transistors try to go above +5 volts, the transistor Q14 will conduct, clamping the emitters of the transistors Q13, Q14 to +5 volts.

Under "brown out" conditions (severe sag in battery voltage), the microprocessor may go into an indeterminate state. A circuit U6 constitutes a low voltage monitor whose output will pull the reset port RST of the microprocessor to ground when the +5 volts supply dips below 4.6 volts, thus resetting the microprocessor.

Lamp Driver and Control

A P-channel field effect transistor (FET) Q12 is used to control an output 120 to the instrument panel indicator lamp. On power up (enable), the comparator U2*a* (FIG. 11C) output is pulled low since a capacitor C26 holds the inverting input to the comparator U2*a* high while it charges through a resistor R51. The emitter of a transistor Q10 is thus low, while the base sees a voltage set by two resistors R79 and R80. The transistor Q10 then turns on, assuming R79 and R80 are sufficiently biased, pulling the gate of a field effect transistor Q12 lower than the source. The field effect transistor Q12 applies power to the instrument panel lamp at the output 120, and also applies a self-latching feedback voltage to the cathode of the diode D10 (FIG. 11A) by way of a diode D30.

A diode D10 at the enable input 102 blocks this voltage from an ENABLE SENSE fine. The purpose of this feedback voltage is for the microprocessor to ensure that the system stays up long enough to perform a solid one second lamp bulb check, regardless of the duration of closure of the ENABLE/OVERRIDE switch input.

When the capacitor C26 charges to below the voltage set by resistors R52 and R53, the output from the comparator U2*a* is turned off and the transistor Q10 is turned off as well. The output from the comparator U2*a* is pulled to +Ven via the resistor R54. This reverse biases the base-emitter junction of the transistor Q10, thus turning Q10 off.

Further control of the lamp bulb driver circuit is provided by a transistor Q9, dependent upon the controller status.

During diagnostic lamp flashing, a signal from the microprocessor port PA2 (FIG. 11D) is capacitatively coupled to a comparator integrated circuit U4*c*. In response to pulses from the microprocessor U1, the comparator U4*c* toggles the base of the transistor Q9, thus causing the lamp to be interrupted in the appropriate diagnostic patterns.

Note that turn-on bias for the transistor Q9 comes by way of a resistor R78 from the diode-OR circuit including diodes D3, D4, D5 and D25 (See FIG. 11F). Capacitive coupling of the diagnostic signal by way of a capacitor C31 (FIG. 11D) ensures that the lamp check and manual override lamp function is retained even if the microprocessor should fail.

Load Control Circuitry

A glow plug power switching relay designated by reference character K1 is under the control of field effect transistors Q7 and Q11 (FIG. 11F). A voltage delay signal from the lamp driver timer is applied to each field effect transistor circuit. This delay signal clamps the relay drivers OFF during the lamp check interval described above, to prevent relay operation until the microprocessor has had sufficient opportunity to become functional and measure the temperature.

If the temperature is above 11° Celsius, the power supply does not latch on, and the relay will not energize.

One requirement of the system is an extremely wide range of operating voltages (from 10 to 33 volts). Physical limitations of the relay will not permit reliable pull-in at 10 volts while not overheating at 33 volts. Note that the transistor Q7 drives the relay through a resistor R55. The relay is designed to pull in reliably at 10 volts, and maintain operations at 17 volts without overheating. The normal range of operation of the system is 24 to 30 volts, so the excess voltage is dropped across the resistor R55, (PWM techniques could optionally be used). Such techniques, however, can give rise to increased electro-magnetic interference potential.

When the battery voltage drops to about 17 volts, the comparator U2*b* (which had been on, holding the transistor Q11 turned off) produces a low output. Transistor Q11 then conducts, shorting out the circuit including resistor R55 and the transistor Q7, and applying full available voltage to the relay K1.

The output of the relay K1 ties to a buss connecting the four fuses 112. The fuses feed four separate output connections for the glow plug circuits, and also feed the OR-diodes D3, D4, D5 and D25. Additionally, a diagnostic input from each fuse output flows back to ports PB0 through PB3 on the microprocessor (see FIG. 12D), by way of resistor-capacitor noise filters including, respectively, resistor R29 and capacitor C13, resistor R30 and capacitor C14, resistor R31 and capacitor C15 and resistor R32 and capacitor C16. Resistors R101 through R104 (FIG. 11E) are pull down resistors to establish a level if a fuse opens.

Part Designations

With reference to the schematic drawings discussed above, the following is an explanation of the function and part numbers for the various integrated circuit chips discussed above and identified generally by the prefix "U."

U1 is either a MC68HC05JICP or MC68HC705J2CP microprocessor.

Each instance of a component designated by the prefix U2 is a comparator designated LM139. Each instance of a component designated by the prefix U3 preferably comprises a voltage regulator designated by Chip No. LP2950ACZ-5.0. Each instance of a component designated by the prefix U4 preferably comprises a quad comparator designated by Chip No. LM2901. The component designated U6 preferably comprises a chip designated MC33164.

Mechanical Features

The mechanical aspects of the controller unit are shown in FIGS. 12–22.

A glow plug controller housing indicated at reference character 300, is a totally sealed aluminum die casting including bottom cover plate 302 defining a gasketed access port 304. The port allows accessibility to the fuses 306 for replacement. Location of this access port requires that the entire assembly be removed from the engine in order to replace fuses. This helps to ensure that only qualified service personnel can replace the fuses. Service personnel have the knowledge and equipment to determine why the fuse blew in the first place, and correct the problem.

Waterproof connectors 308 conduct power and signal voltages in and out of the enclosure. Circuitry is carried on a printed circuit board 310, along with the power relay 312 (a totally enclosed solenoid) and the fixed connectors. A small printed circuit board mounts the fuse clips 318, and is supported off the main board by extended connector 316 on the glow plug controller.

The complete electronic assembly can thus be built and tested as a unit, then placed into the enclosure. The main board is encapsulated in place with potting compound to support all components against vibration. Of course, the fuse board is exposed, being above the level of potting. Attachment screws 320 (FIG. 22) are placed through the housing into threaded holes on the connection flanges prior to potting. Attachment of the bottom gasket and base plate complete the assembly.

As mentioned in the foregoing specification, the microprocessor performs a multiplicity of functions related to monitoring and control of engine and glow plug operation.

The problem of undesirable compression reduction, as discussed in the background section is readily sensed and corrected by the use of barometric and/or engine compression sensors. Designers skilled in the art can empirically determine the optimal engine temperature as a function of pressure at peak compression. A microprocessor or other suitable analog or digital computing device could readily adjust the temperature in response to pressure inputs. For instance, if the barometric pressure were depressed, a look-up table or software algorithm can be utilized to determine the optimal operating temperature for that condition, i.e., the temperature would increase with altitude due to lower atmospheric pressure and density. Similarly, the temperature would need to increase if the engine's compression dropped. In the case of barometric pressure, the pressure could be read prior to engine start-up and the control temperature would then be adjusted accordingly. For engine compression, the compression would have to be determined in the previous period of operation, stored, and then retrieved prior to the next period of operation. An additional control variable can be obtained from an engine exhaust sensor that measures a parameter such as oxygen, carbon monoxide or smoke. Data from previous operation periods is stored and used to raise or lower the control temperature of the glow plugs for the next operating period to minimize undesired exhaust components such as smoke or achieve an ideal level for a given exhaust component such as oxygen.

In many cases, glow plugs are operated for a period after engine start-up to maintain temperature until the engine self-heating can take over. Usually, this is done for a fixed time and/or with temperature sensor feedback. In cases where compression pressure, barometric pressure and/or exhaust sensors are utilized, their instantaneous output is used to modify the glow plug control temperature and/or period of operation after engine start-up. Again, look-up tables and/or suitable algorithms can be determined by those of ordinary skill in the art, through empirical measurement to determine ideal temperatures and/or periods of operation for glow plugs correlated with the various sensor outputs.

Thus far, there has been disclosed in detail a glow plug controller, partially comprising a microprocessor, which controls glow plug operation as a function of sensed engine coolant temperature, i.e., engine temperature. The present invention is, however, by no means limited to controlling glow plug operation as a function of only engine temperature. Other parameters, related to the status of engine operation or characteristics, can be used as well by a microprocessor controlled glow plug controller to influence glow plug operation.

For example, engine cylinder compression, in addition to engine temperature, can be used to regulate glow plug operation. In such an embodiment, a compression sensor is used to provide an input to the microprocessor digital logic circuitry. The digital logic circuitry responds to the compression sensor information to increase glow plug heating as engine compression decreases.

Sensors of engine cylinder compression are well known in the art. For those not intimately familiar with this technology, however, the following publication, describing such a compression sensor, is hereby incorporated by reference: *SENSORS, THE JOURNAL OF APPLIED SENSING TECHNOLOGY*, "A Fiber-Optic Combustion Pressure Sensor System for Automotive Engine Control", June 1994, pp. 35–42.

The previously disclosed embodiment of the present invention provides those of ordinary skill in the art a specific example of how to program a microprocessor for controlling glow plug operation as a function of an engine-related parameter, such as engine temperature. It is well within the ordinary skill to create similar programs for controlling glow plug operation as a function of other variables, such as engine compression. For the benefit of those not intimately familiar with this art, however, FIGS. 23A and 23B constitute a flow chart describing the manner in which digital logic circuitry, such as a microprocessor is programmed in order to govern glow plug operation as a function of engine temperature and engine compression.

Figure 23:
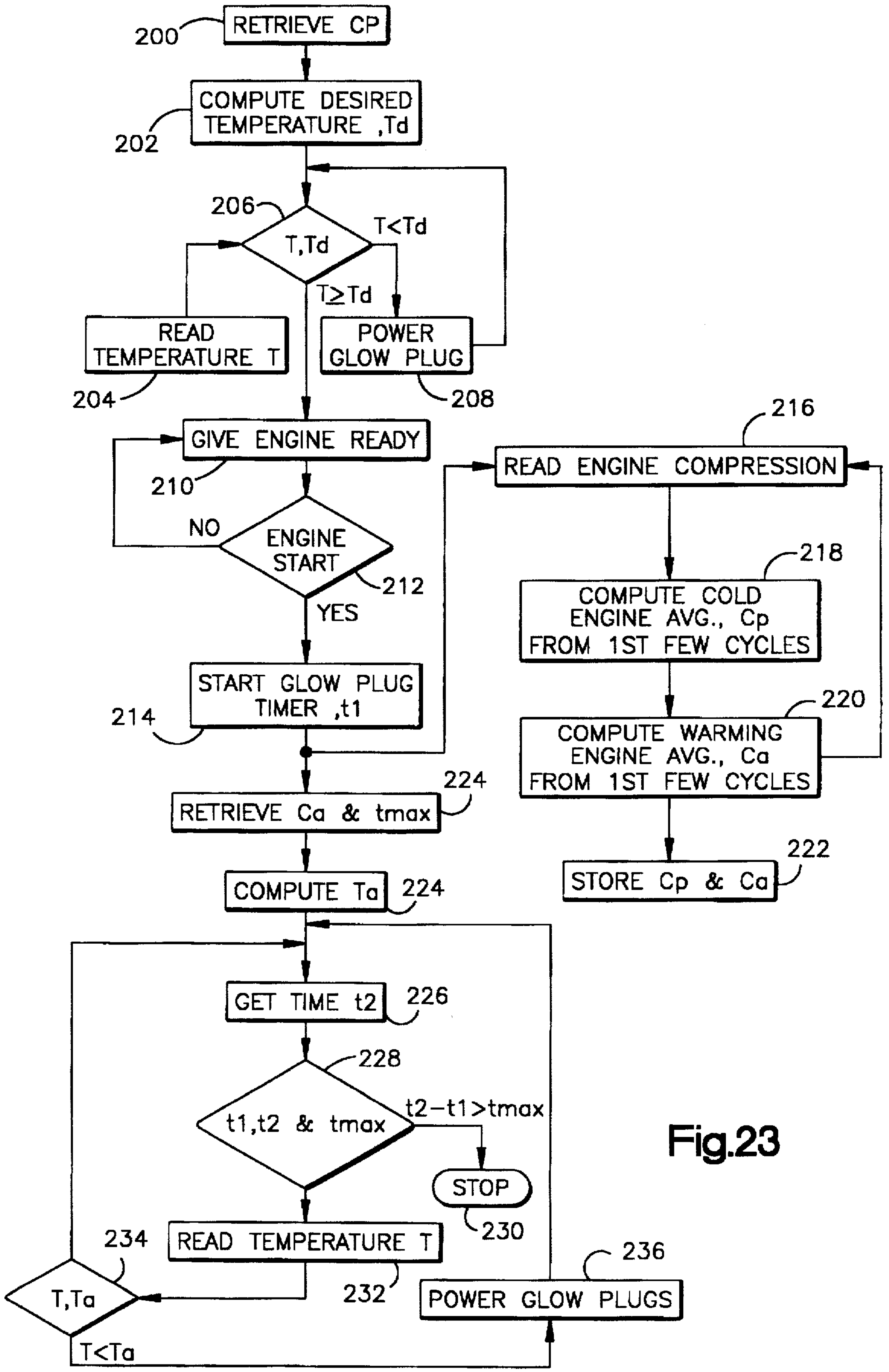
FIG. 23 is a flow chart illustrating an aspect of operation of the present invention, wherein glow plug operation is controlled as a function of engine temperature and engine cylinder compression.

The steps shown in FIG. 23 begin with retrieving 200 the average "Cold Engine" average compression "Cp". "Cp" is as computed and stored in a previous cycle of operation or is a factory set default on the first cycle of operation after a reset. A "look up" table or stored algorithm is then used to compute 202 a desired glow plug temperature "Td" for engine starting. A suitable "look up" table or algorithm could be readily determined from empirical studies of engines spanning a range of "Cold Engine" compression values. Once a "Td" has been determined, the glow plug temperature "T" is read 204. "T" is then compared 206 to "Td." If "T"<"Td", power is applied 208 to the Glow Plug(s). Steps 204, 206 and 208 are then repeated until "T" equals or exceeds "Td".

After "T" has risen to "Td" an "Engine Ready" indication is given 210. This indication can be a light, audible tone, both or other means to indicate to the operator that the engine is ready to be started. In some applications it may be desirable to have the controller initiate an engine start at step 210 instead of merely providing an indication of engine status. The controller then monitors 212 the engine to determine when it actually starts. A common means to detect engine start is to monitor the voltage from the alternator (not shown).

Once the engine start has been detected, the controller begins a timer 214 (t1). During the first few cycles of operation after engine start, the engine compression is read 216 and a "Cold Engine" average compression "Cp" is computed 218. During the first "n" cycles of operation after engine start, the engine compression is read 216 and a "warm Engine" average compression "Ca" is computed 220. Once a "Cp" and a "Ca" have been computed they are stored 222 where they will be available for retrieval the next engine starting sequence.

Concurrent with initiation of the steps 216, 218, 220, 222 the previous "Ca" and a predetermined maximum time "tmax" are retrieved 224. "Ca" is then used to compute a desired glow plug operating temperature "Ta" at step 224. As in step 202, an empirically determined "look up" table or algorithm can be used to compute "Ta". The time "12" is then measured 226 and the difference "t2–t1" is compared to "tmax" at step 228. If the difference exceeds "tmax", the controller is stopped 230 and power to the glow plug(s) is discontinued. If the difference does not exceed "tmax", the glow plug temperature "T" is read 232 and compared to the desired operating temperature "Ta" 234. If "T"<"Ta", power is applied to the glow plug(s) 236 and steps 226–236 are repeated. If "T" equals or exceeds "Ta", step 236 is skipped and control is transferred back to step 226 where the process can repeat until step 230 is reached.

According to another embodiment, the present invention controls glow plug operation as a function of ambient barometric pressure. Barometric pressure sensors are well known in the art, and, for that reason, will not be described in detail here. Suffice it to say that a barometric pressure sensor is used to provide an analog input to the glow plug controller whose value is a function of barometric pressure. The analog barometric pressure indicating signal is digitized in known fashion, as disclosed above in connection with the engine temperature signal, and then can be processed by the digital logic circuitry, such as a microprocessor, and the output of the microprocessor reconverted to analog form and used to control glow plug operation. As barometric pressure is reduced, the air with which fuel is mixed becomes less dense. Thin air, when compressed, rises less in temperature than does dense air, given the same compression volume ratio. Therefore, it is desirable, when barometric pressure drops, extra heating to effect reliable combustion should be provided by the glow plugs. Accordingly, the present embodiment responds to a decrease in barometric pressure to increase glow plug heating. Usually, the increase in glow plug heating is done by lengthening the time period of pre-glow or after-glow, or by increasing the duty cycle of operation of the glow plugs.

Figure 24:
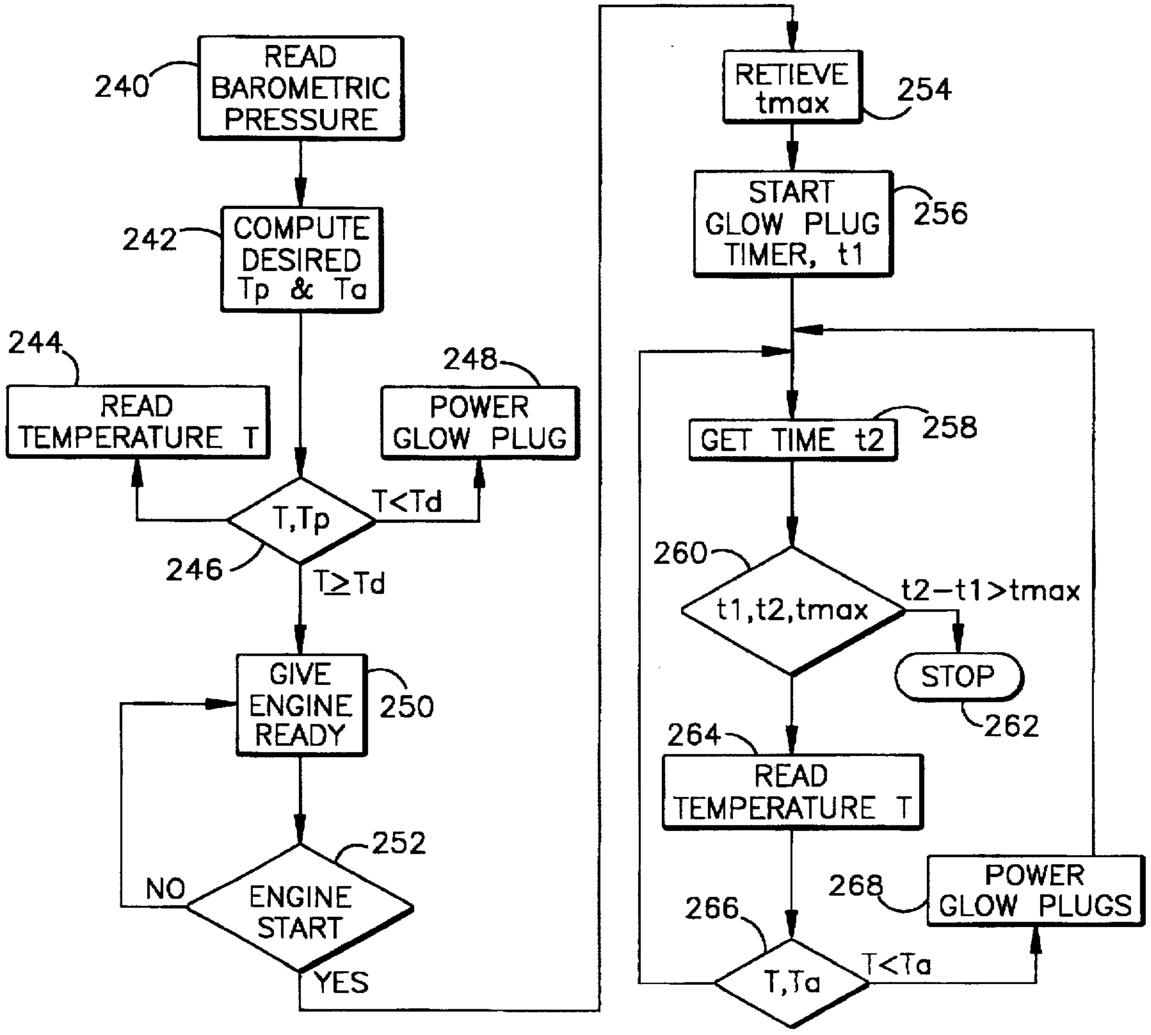
FIG. 24 is a flow chart illustrating a manner of programming an embodiment of the present invention to control glow plug operation as a function of barometric pressure.

FIG. 24 shows method steps 240–268 a flow chart for use in programming digital logic circuitry for increasing glow plug heating operation as a function of decreasing barometric pressure.

The barometric pressure is read 240 prior to engine startup. A "look up" table or algorithm is then used to compute 242 desired glow plug temperatures "Tp" & "Ta". "Tp" is the desired temperature prior to starting and "Ta" is the desired temperature after engine start. The "look up" tables or algorithm can be readily determined by empirical means by studying engine starting and running characteristics over a range of barometric pressures. For instance, the "Tp" required to start an engine at an elevation of 5,000 feet could be expected to be higher than that required at sea level.

After computation of "Tp" and "Ta" the glow plug temperature "T" is read 244 and then compared to "Tp" at step 246. If "T"<"Tp", the Glow Plug is then powered 248 and steps 244, 246, 248 are repeated until "T" is greater or equal to "Tp". Once "T" reaches "Tp", an "Engine Ready" indication is given 250. This indication can be a light, audible tone, both or other means to indicate to the operator that the engine is ready to be started. In some applications it may be desirable to have the controller initiate an engine start at step 250 instead of merely providing an indication of engine status.

The controller next monitors 252 the engine to determine when it actually starts. A common means to detect engine start is to monitor the voltage from the alternator (not shown). Once the engine start has been detected, the controller retrieves 254 a maximum time value "tmax" and begins a timer (t1) at step 256. The time "12" is then read at step 258 and "t2–t1" is compared to "tmax" at step 260. If "t2–t1" exceeds "tmax", the process is stopped 262. If "t2–t1" does not exceed "tmax", the glow plug temperature "T" is then read 264 and compared 266 to the desired temperature "Ta". If "T" is less then "Ta", power is applied to the Glow Plug(s) at step 268 and steps 258, 260, 264, 266 are repeated. When "T" has reached "Ta", step 268 is bypassed (the Glow Plug(s) are not powered) and steps 258–266 are repeated until step 262 is reached, i.e., "t2–t1">"tmax".

According to still another embodiment, an exhaust sensor is provided. The exhaust sensor produces an analog signal whose value is a function of the presence of a particular sensed component or components of engine exhaust. The present embodiment adjusts glow plug operation as a function of the amount of one or more of the particular sensed exhaust components. As in the case of parameters disclosed in connection with the previously disclosed embodiments, exhaust sensors are well known in the art. Such sensors can detect the presence of various exhaust components. Detection of exhaust components give rise to information relating to the degree of completeness of combustion of the fuel in the engine cylinders. The presence of smoke, resulting from particulate matter, usually indicates incomplete combustion. So does a relatively high fraction of oxygen in the exhaust.

As with other types of exhaust sensors, oxygen exhaust sensors are well known in the art. Such a sensor is used to provide an analog signal whose value indicates the amount of sensed oxygen in the exhaust. This value is digitized for subsequent handling by the digital logic circuitry. After processing by the digital logic circuitry, the digital logic circuitry produces an output for governing glow plug operation. That output is reconverted to analog form and used to control the glow plug.

In the present embodiment, the amount of glow plug heating is increased in response to the increased sensing of exhaust components which result from incomplete combustion. Accordingly, as sensed oxygen rises, the glow plug controller adjusts the glow plugs to provide additional heating.

In this embodiment, the mount of additional glow plug heating is a function of the mount of oxygen sensed in the exhaust during the last previous period of operation. A non-volatile memory is provided for storing the output of the exhaust sensor. The memory saves the stored value until the engine is restarted, at which time it adjusts glow plug operation as a function of the stored data representing earlier exhaust component information.

Figure 25:
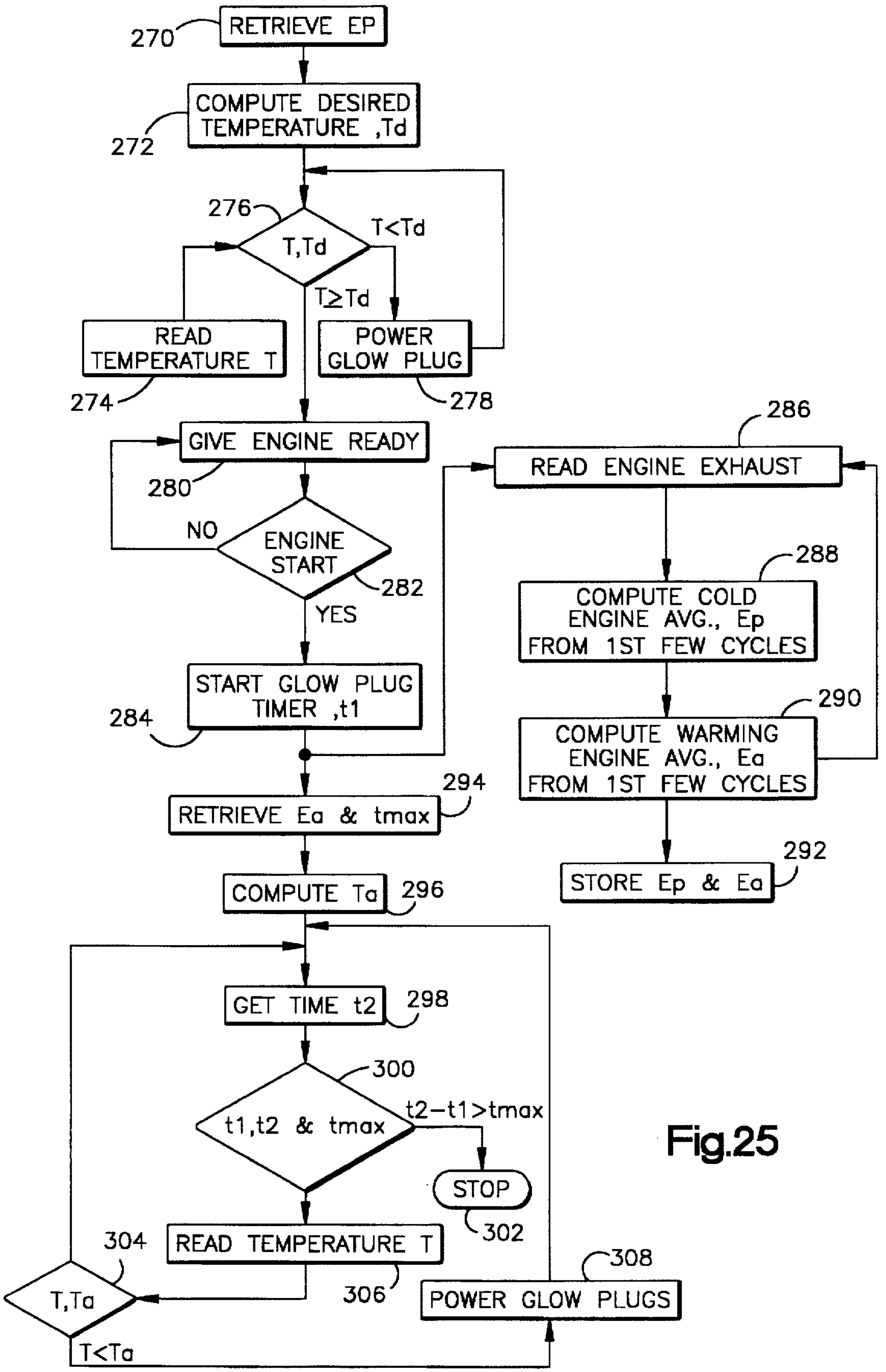
FIG. 25 is a flow chart illustrating a manner of programming an embodiment of the present invention to control glow plug operation in response to the amount of an exhaust component.

FIG. 25 is a flow chart setting forth the manner of programming the digital logic circuitry in order to accomplish the function of this particular embodiment. The method of programming is virtually identical to that of FIG. 24, except that a different variable is being sensed.

The steps shown in FIG. 25 begin with retrieving the average exhaust oxygen "Ep" (step 270). "Ep" is as computed and stored in a previous cycle of operation or is a factory set default on the first cycle of operation or after a reset. A "look up" table or stored algorithm is then used to compute a desired temperature "Td" for engine starting in step 272. A suitable "look up" table or algorithm could be readily determined from empirical studies of oxygen emissions from starting engines spanning a range of "Cold Engine" starting temperatures. Once a "Td" has been determined, the glow plug temperature "T" is read in step 274. "T" is then compared to "Td" in step 276. If "T"<"Td", power is applied to the Glow Plug(s) in step 278. Steps 274 through 278 are then repeated until "T" equals or exceeds "Td". After "T" has risen to "Td" an "Engine Ready" indication is given in step 280. This indication can be a light, audible tone, both or other means to indicate to the operator that the engine is ready to be started. In some applications it may be desirable to have the controller initiate an engine start at step 280 instead of merely providing an indication of engine status. The controller then monitors the engine to determine when it actually starts (step 282). A common means to detect engine start is to monitor the voltage from the alternator (not shown). Once the engine start has been detected, the controller begins a timer at step 284(t1). During the first few cycles of operation after engine start, the exhaust oxygen is read (step 286) and a "Cold Engine" average exhaust oxygen "Ep" is computed (step 288). During the first "n" cycles of operation after engine start, the exhaust oxygen is read (step 286) and a "Warm Engine" average exhaust oxygen "Ea" is computed at step 290. Once an "Ep" and an "Ea" have been computed, they are stored at step 292 where they will be available for retrieval during the next engine starting sequence. Concurrent with initiation of steps 286–292, the previous "Ea" and a predetermined maximum time "tmax" are retrieved at step 294. "Ea" is then used to compute a desired engine operating temperature "Ta" at step 294. "Ea" is then used to compute a desired engine operating temperature "Ta" at step 294. As in step 272, an empirically determined "look up" table or algorithm can be used to compute "Ta". The time "t2" is then measured at step 298 and the difference "t2–t1" is compared to "tmax" at step 300. If the difference exceeds "tmax", the controller is stopped (step 302) and power to the glow plug(s) is discontinued. If the difference does not exceed "tmax", the glow plug temperature "T" is read at step 306 and compared to the desired operating temperature "Ta" at step 304. If "T"<"Ta", power is applied to the glow plus(s) at step 308 and steps 296–3008 are repeated. If "T" equals or exceeds "Ta", step 308 is skipped and control is transferred back to step 296 where the process can repeat until step 302 is reached.

In certain applications it will be desirable to add a data communications link with an engine control module (ECM). On many diesel platforms there is an ECM reading information from exhaust, temperature, barometric and/or other existing sensors. In some cases the ECM reads sensors such as a barometric pressure sensor that are used in glow plug control algorithms such as that in FIG. 24. In such cases a single data connection to the ECM is used to eliminate the additional signal lines and/or sensors that would be required for the controller to obtain these values.

It should be noted that the digital logic circuitry, in order to embody this invention, need not comprise a microprocessor. Rather, the function of the microprocessor described above can often suitably be performed by the use of either a programmable logic device (PLD) or by a custom logic device (CLD). A programmable logic device is a well known type of digital logic circuit package consisting of an array of gates, comparators, and the like. A programmable logic device can be programmed, or configured, to present to an input one of a plurality of sets of gate arrays. Each gate array constitutes digital logic circuitry for controlling the pattern, or program, with which the programmable logic device responds to an input to create an output.

A custom logic device is somewhat similar to a programmable logic device, in that it constitutes an array of gates. A custom logic device, however, cannot be pre-configured to present a plurality of sets of gate arrays. Rather, a custom logic device embodies only one array of gates, and that configuration cannot be altered without substantially changing the circuitry.

The digital logic circuitry can be programmed to perform certain adaptive processes. An adaptive process is a process which changes as a result of prior periods or sequences of sensed variables. Adaptive processes are discussed in U.S.

Pat. No. 5,334,876. This patent is owned by the assignee of the present application.

It should be appreciated that the present invention has been described with a certain degree of particularity, but that this illustration is not intended to limit the scope of the invention. It is therefore the intent that the invention include all modifications and alterations falling within the spirit and scope of the invention, as defined in the appended claims.

We claim:

1. A glow plug controller for a diesel engine comprising:

a) a temperature sensor for monitoring the temperature of a portion of a diesel engine; and b) glow plug controller circuitry coupled to said temperature sensor for controlling operation of one or more diesel engine glow plugs of the combustion chambers of the diesel engine as a function of temperature; said glow plug controller circuitry comprising: i) oscillator means to provide a clock signal for operations in conjunction with the glow plug controller circuitry; ii) digital logic means used in conjunction with said oscillator means to monitor time intervals for control functions of said glow plug controller circuitry; and iii) output circuitry coupled to the digital logic means for applying current to the one or more diesel engine glow plugs before or after starting the diesel engine.

2. The glow plug controller of claim, 1 wherein the digital logic means comprises a programmable logic device.

3. The glow plug controller of claim 2 wherein the programmable logic device comprises a microprocessor.

4. The glow plug controller of claim 3 wherein the microprocessor comprises a stored program for implementing a glow plug control that adapts to changing conditions during operation of the glow plug controller.

5. The glow plug controller of claim 1 wherein the output circuity includes one or more electronic switching devices for applying current to said one or more glow plugs of said diesel engine.

6. The glow plug controller of claim 5 wherein the digital logic means comprises a current sensor and further wherein the digital logic means comprises means for monitoring a current signal from the current sensor and means for open circuiting said one or more electronic switching devices when current as sensed by the current sensor reaches an undesirable level.

7. The glow plug controller of claim 1 wherein said digital logic means monitors the temperature output of the temperature sensor and controls a time duration of a preheat of the one or more diesel engine glow plugs prior to application of a starting signal for starting the diesel engine.

8. The glow plug controller of claim 1 wherein said digital logic means monitors the temperature output of the temperature sensor and applies current to the one or more glow plugs during a controlled time duration after the diesel engine starts.

9. The glow plug controller of claim 1 wherein the digital logic means comprises an indicator device to provide an indication of operation modes or conditions of the diesel engine.

10. The glow plug controller of claim 9 wherein the indicator device comprises a light emitting diode.

11. The glow plug controller of claim 9 wherein the indicator device comprises a sound emitting device.

* * * * *